(12) United States Patent
Kawano et al.

(10) Patent No.: US 10,019,493 B2
(45) Date of Patent: Jul. 10, 2018

(54) RELATED INFORMATION PRESENTATION DEVICE, AND RELATED INFORMATION PRESENTATION METHOD

(71) Applicant: NEC Corporation, Tokyo (JP)

(72) Inventors: Hirokazu Kawano, Tokyo (JP); Takuya Abe, Tokyo (JP); Kengo Yamaguchi, Tokyo (JP)

(73) Assignees: NEC CORPORATION, Tokyo (JP); NEC SOLUTION INNOVATORS, LTD., Tokyo (JP)

( * ) Notice: Subject to any disclaimer, the term of this patent is extended or adjusted under 35 U.S.C. 154(b) by 465 days.

(21) Appl. No.: 14/439,409

(22) PCT Filed: Oct. 31, 2013

(86) PCT No.: PCT/JP2013/079585
§ 371 (c)(1),
(2) Date: Apr. 29, 2015

(87) PCT Pub. No.: WO2014/069582
PCT Pub. Date: May 8, 2014

(65) Prior Publication Data
US 2015/0302065 A1    Oct. 22, 2015

(30) Foreign Application Priority Data
Nov. 5, 2012 (JP) .................. 2012-243474

(51) Int. Cl.
*G06F 17/30* (2006.01)
*H04L 29/08* (2006.01)
*H04L 29/06* (2006.01)

(52) U.S. Cl.
CPC .. *G06F 17/30554* (2013.01); *G06F 17/30864* (2013.01); *G06F 17/30867* (2013.01);
(Continued)

(58) Field of Classification Search
CPC ......... G06F 17/30067; G06F 17/30991; G06F 17/30873; G06F 17/30554;
(Continued)

(56) References Cited

U.S. PATENT DOCUMENTS

| | | | |
|---|---|---|---|
| 2005/0108217 A1* | 5/2005 | Werner | G06F 17/30991 707/609 |
| 2009/0254971 A1* | 10/2009 | Herz | G06Q 10/10 726/1 |
| 2015/0127565 A1* | 5/2015 | Chevalier | G06Q 10/00 705/319 |

FOREIGN PATENT DOCUMENTS

| | | |
|---|---|---|
| JP | 2000-066970 | 3/2000 |
| JP | 2001-350796 | 12/2001 |

(Continued)

OTHER PUBLICATIONS

International Search Report, PCT/JP2013/079585, dated Nov. 26, 2013.

*Primary Examiner* — Shahid Alam
(74) *Attorney, Agent, or Firm* — Young & Thompson

(57) ABSTRACT

A related information presentation device is designed to communicate client terminals so as to search and present users with useful content information unanticipated by users with reference to a plurality of indirectly related content information which is not directly related to each other but which is assumed to be indirectly related to each other through the same relevant content information. Upon receiving a search expression input by each user of a client terminal, the related information presentation device searches specific content information so as to automatically extract indirectly related content information, correlated to the specific content information, from among a plurality of indirectly related content information. Subsequently, the related information presentation device generates display (Continued)

data representing a graph connecting between a node representing the specific content information and a node representing the indirectly related content information via an edge, thus transmitting the display data to the client terminal.

16 Claims, 25 Drawing Sheets

(52) U.S. Cl.
CPC .. *G06F 17/30873* (2013.01); *G06F 17/30958* (2013.01); *H04L 67/10* (2013.01); *H04L 67/327* (2013.01); *H04L 67/42* (2013.01)

(58) Field of Classification Search
CPC ......... G06F 17/30867; G06F 17/30864; G06F 17/30958; H04L 67/327; H04L 67/10; H04L 67/42

USPC .......................................... 707/609, 828, 722
See application file for complete search history.

(56) References Cited

FOREIGN PATENT DOCUMENTS

| JP | 2001350796 | * 12/2001 | ....... G06F 17/30367 |
|---|---|---|---|
| JP | 2005-078633 | 3/2005 | |
| JP | 2005078633 | * 3/2005 | ....... G06F 17/30991 |
| JP | 2005-108123 | 4/2005 | |
| JP | 3813850 | 8/2006 | |
| JP | 2008-269053 | 11/2008 | |
| JP | 2008-276529 | 11/2008 | |
| JP | 2009-075777 | 4/2009 | |
| JP | 2010-079872 | 4/2010 | |
| JP | 2011-002955 | 1/2011 | |
| JP | 2011-108042 | 6/2011 | |

\* cited by examiner

| CONTENT | CONTENT |
|---------|---------|
| A CO.   | B CO.   |
| C CO.   | A CO.   |
| A CO.   | D CO.   |
| ⋮       | ⋮       |

|  |  | 216 |
| --- | --- | --- |
| CONTENT | CONTENT | RELATED CONTENT |
| A CO. | B CO. | A DIVISION |
| A CO. | B CO. | B DIVISION |
| A CO. | B CO. | TEXT FILE A |
| ⋮ | ⋮ | ⋮ |

RELATED INFORMATION PRESENTATION DEVICE, AND RELATED INFORMATION PRESENTATION METHOD

TECHNICAL FIELD

The present invention relates to a related information presentation device and a related information presentation method applied to a keyman search system which searches human network information and related information according to desired search conditions.

The present application claims priority on Japanese Patent Application No. 2012-243474 filed Nov. 5, 2012, the entire content of which is incorporated herein by reference.

BACKGROUND ART

In this age of the advanced information society, it is difficult for any persons to carry out jobs solely using expertise of personal specialized fields; hence, it is necessary for any persons to occasionally obtain another persons' cooperation or assistance in addition to individuals' knowledge and capabilities. Conventionally, engineers have developed technologies to search human network information or related information by use of emails, social networking systems, databases, servers, and data mining tools.

Patent Literature Document 1 discloses a human network information management system which can efficiently manage human network information produced based on message information via networks. Specifically, the human network management system specifies addressers and addressees based on message information so as to generate relation information showing links between addressers and addressees. Additionally, it specifies unique information concerning addressees and addressers based on message information, thus generating attribute information representing attributes of addressers and addressees based on unique information. The human network management system generates and outputs human network information representing linking strengths according to relation information and attribute information. Thus, the human network management system can efficiently form and manage human network information based on message information such as emails and news groups.

Patent Literature Document 2 discloses a search device and a search method, which receives search requests used to search users who can reply to users' queries so as to search desired users in response to search requests from a plurality of users operating mobile terminals connected to networks. Specifically, the search device extracts users related to fields matching users' queries based on profile information including users' shared messages and users' specialized fields. The search method calculates adaptations representing degrees of interchanging with search requesters such that adaptations become higher in connection with a larger number of history data and a larger number of first-type emails with reference to history data regarding first-type emails (i.e. emails designating addresses identifying extracted users or search requesters) and second-type emails (i.e. emails designating carbon-copy recipients identifying extracted users or search requesters) included in communication histories of emails from search requesters with respect to each of the extracted users. The search method determines whether each user's current status is any one of "attendance", "floating", and "absence" based on the operating status representing each extracted user operating his/her mobile terminal and the current location of each user obtained from schedule information. As to a search request including search conditions requesting immediate reply or demanding direct accessibility, the search method multiplies the adaptability of a user with the current status "attendance" by the highest weight while multiplying the adaptability of a user with the current status "floating" by the second highest weight, thus applying a first weight to the adaptability of each extracted user. As to a search request including a search condition of prioritizing managerial personnel, the search method multiplies the adaptation of a user holding a post of a "manager" according to the profile information (e.g. "manager", "chief", or "non-post") by the highest weight while multiplying the adaptation of a user serving as a "chief" by the second highest weight, thus applying a second weight to the adaptation of each extracted user. As to a search request including a search condition designating a practitioner, the search method multiplies the adaptation of a user holding a post of a "chief", according to the profile information, by the highest weight while multiplying the adaptation of a user serving as "non-post" by the second highest weight, thus applying a third weight to the adaptation of each extracted user. Additionally, the search method presents users, selected based on adaptations multiplied by weights corresponding to the extracted users, to search requesters. That is, the search method selects users in consideration of users' current statuses added to users' specialized fields; hence, it is possible to search users who can reliably reply to user queries.

Patent Literature Document 3 discloses a human network information display method which can display a human-network map representing the relationship among multiple persons. Specifically, the human network information display method extracts metadata concerning persons from electronic data including information specifying persons, correlates metadata upon creation of person specifying information, and then graphically displays the correlation between persons based on the correlated metadata. The human network information display method can dynamically display persons holding necessary knowledge and other persons having human networks with those persons on screen in real time based on the automatically collected modern data; hence, it is possible to offer effects of easily selecting the optimum locations suitable to gather talented people.

Patent Literature Document 4 discloses a human network configuration creating device which can create a human network configuration among persons applicable to predetermined events. Specifically, the human network configuration creating device retrieves email data so as to generate logs correlated to search words related to events from email data and links among applicable persons. The human network configuration creating device searches logs corresponding to search words and search conditions set to users. Additionally, the human network configuration creating device creates a human network configuration based on applicable persons included in the searched logs and links between those applicable persons. Thus, it is possible to easily create a human network configuration with respect to persons applicable to predetermined events.

Patent Literature Document 5 discloses an access information storage device which can store personal identification information and access information for individuals specified by personal identification information, and an information processing device which can transmit personal identification information to the access information storage device so as to obtain access information for individuals specified by personal identification information. Specifically, the information processing device includes an access history storage unit which can store a plurality of personal identifications having access histories with the access information storage device in connection with common requirements. Additionally, the information processing device receives first personal identifications and common requirements so as to extract second personal identifications, related to first personal identifications, from the access history storage unit while obtaining access information for individuals specified by personal identifications from the access information storage device. The information processing device includes an access history storage unit, a search word input part, a search processing part, and a search result output part. When each user contacts other persons having weak relations with each user with respect to the desired requirements, the information processing device can output human paths, representing a history of each user having contacts with other persons who each person wish to contact with respect to the requirements in the past, thus allowing each user to browse human paths.

Patent Literature Document 6 discloses a search assistant device which can search persons having high relativities with searching subjects by use of emails serving as community information. Specifically, the search assistant device includes message identifying information specifying emails, thread identifying information specifying threads included in emails, an email table storing records concerning senders and receivers, and a keyword table storing thread identifying information in connection with keywords. The search assistant device reads emails from the email storage means, obtains message identifying information concerning other relevant emails from header information of emails, and then determines whether or not message identifying information is registered in the email table. The search assistant device newly generates thread identifying information from the read emails upon determining that message identifying information is not registered in the email table. Upon determining that message identifying information is registered in the email table, the search assistant device obtains thread identifying information from records of the email table specified by message identifying information of other relevant emails. Then, the search assistant device adds message identifying information obtained from the header information of the read emails, senders and receivers, and the newly generated thread identifying information or thread identifying information read from the email table to the email table. Additionally, it writes keywords, resulting from morphological analysis on information retrieved from the read emails, in the keyword table in connection with thread identifying information. Upon receiving search conditions, the search assistant device obtains thread identifying information concerning keywords corresponding to search keywords included in search conditions, from the keyword table. Additionally, it obtains users who are designated as senders or receivers based on records of the email table for each thread identifying information, and the number of keywords concerning users being designated as senders or receivers from the keyword table. Then, the search assistant device outputs a user having a large number of keywords obtained from the keyword table with respect to each thread identifying information. Thus, the search assistant device can present important persons with respect to the desired searching subjects, thus allowing operators to easily grasp links among important persons.

Patent Literature Document 7 discloses a human network candidate presentation device which can present timings of requesting connections with users and human network candidates without needing explicit registration of activity history information. Specifically, the human network candidate presentation device can obtain persons concerned with each of stages of activities included in various projects, an activity stage history including a start time and an end time for each stage, and text communication history information representing a communication history described using messages of concerned persons. Then, it extracts characteristic words from text communication history information concerning the start time and the end time with respect to each person concerned with each of stages of activities in a desired project. Thereafter, the human network candidate presentation device specifies the stage having a characteristic word identical or similar to the extracted characteristic word among the characteristic words extracted from the text communication history information with reference to each stage of activities in a specific project concerned with a specific person.

Patent Literature Document 8 discloses a human network search device which can search a human network between a specific person and any targeted person. Specifically, the human network search device extracts human network-related information, representing the relativity between participants attending meetings, from electronic documents describing a plurality of minutes data recording contents of meetings. Then, the human network search device extracts human-network routes among participants based on human network-related information so as to search a predetermined human-network route, ranging from a specific person attending to the predetermined meeting to any targeted person, among a plurality of human-network routes. Thus, it is possible to search human-network routes directed to target talented people by use of a plurality of minutes data resulting from face-to-face communications.

CITATION LIST

Patent Literature Document

Patent Literature Document 1: Japanese Patent Application Publication No. 2000-66970

Patent Literature Document 2: Japanese Patent No. 3813850

Patent Literature Document 3: Japanese Patent Application Publication No. 2005-108123

Patent Literature Document 4: Japanese Patent Application Publication No. 2008-269053

Patent Literature Document 5: Japanese Patent Application Publication No. 2008-276529

Patent Literature Document 6: Japanese Patent Application Publication No. 2010-79872

Patent Literature Document 7: Japanese Patent Application Publication No. 2011-2955

Patent Literature Document 8: Japanese Patent Application Publication No. 2011-108042

SUMMARY OF INVENTION

Technical Problem

The foregoing conventional technologies are designed to search information matching or hitting desired search conditions by narrowing down the scope of searching human network information and related information. For this reason, those technologies cannot present search results concerning human network information and related information precluded from the search scope in advance (e.g. user's unanticipated information). This raises a problem that search results concerning human network information and related information have low availability. The present invention aims to solve the problems of the conventional technologies; hence, it is an object of the invention to provide a related information presentation device and a related information presentation method adapted to a keyman search system configured to search human network information and related information.

Solution to Problem

In a first aspect, the present invention is directed to a related information presentation device including: an indirectly related information storage unit configured to store a plurality of content information, which is not directly related to each other but which is assumed to be indirectly related to each other through same relevant content information directly related thereto, in connection with each other; a search expression input receiving part configured to receive a user's input of a search expression; a content specifying part configured to specify single content information based on the search expression; an indirectly related information extraction part configured to extract content information, correlated to the content information specified by the content specifying part, from the indirectly related information storage unit; a display data generation part configured to generate display data representing a graph connecting between a node representing the content information specified by the content specifying part and a node representing the content information extracted by the indirectly related information extraction part via an edge; and display data output part configured to output the display data.

In a second aspect, the present invention is directed to a related information presentation method including: receiving a user's input of a search expression; specifying single content information based on the search expression; extracting content information, correlated to the content information specified based on the search expression, from a plurality of content information which is not directly related to each other, which is assumed to be indirectly related to each other through same relevant content information directly related thereto, and which is stored in connection with each other; generating display data representing a graph connecting between a node representing the specified content information and a node representing the extracted content information via an edge; and outputting the display data.

Advantageous Effects of Invention

The present invention can dynamically link a plurality of directly irrelevant content information via the same relevant content information directly relevant to them so as to present users with useful content information unanticipated by users. That is, it is possible to automatically extract content information directly and indirectly relevant to search information without being univocally constrained search expressions, thus presenting users with the extracted content information. Thus, it is possible to reduce a possibility of overlooking content information useful for users.

BRIEF DESCRIPTION OF DRAWINGS

FIG. 3 shows content information in a table form stored in an indirectly related information storage unit of the related information presentation device of the first embodiment.

DESCRIPTION OF EMBODIMENTS

Figure 1:
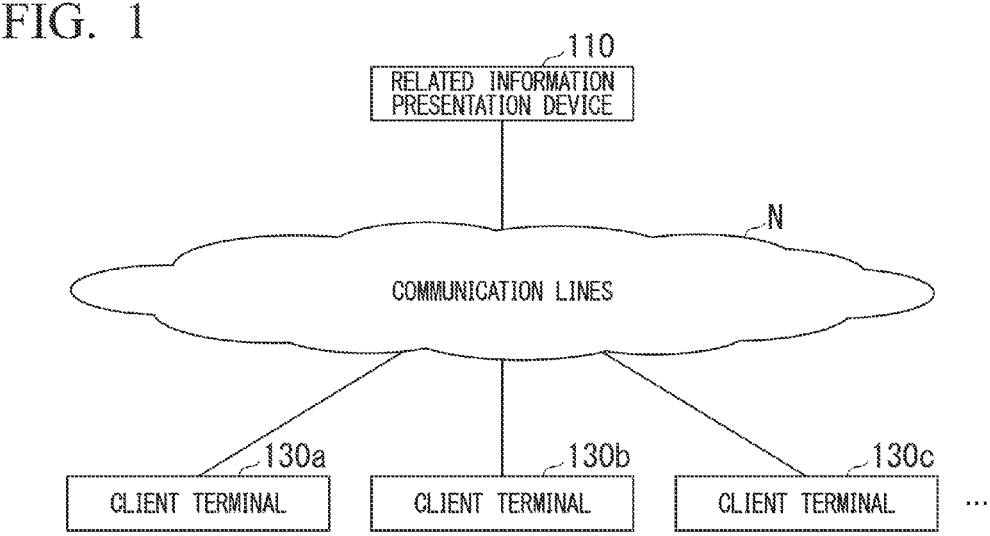
FIG. 1 is a system configuration diagram showing an example of an applied environment of a related information presentation device according to a first embodiment of the present invention.

The present invention is directed to a related information presentation device and a related information presentation method applied to a keyman search system configured to search human network information and related information. The present invention will be described in detail by way of embodiments with reference to the accompanying drawings. In this connection, the same reference signs will be applied to the same or similar constituent elements in the drawings; hence, the detailed descriptions thereof will be omitted as necessary.

First Embodiment

FIG. 1 is a system configuration diagram showing an example of an applied environment with respect to a related information presentation device 110 according to the first embodiment of the present invention. The related information presentation device 110 presents desired content information as well as content information related to the desired content information. Herein, content information refers to individuals, organizations, text files, worksheet files, presentation files, and keywords. For example, any contents concerning individuals refer to names of individuals or the like. Any contents concerning organizations refer to names of organizations or the like. Any contents concerning text files, worksheet files, or presentation files refer to file names. Any contents concerning keywords refer to keywords or the like.

The related information presentation device 110 is wirelessly connected to a plurality of client terminals 130 (i.e. client terminals 130a, 130b, 130c, etc.) via communication lines N. Communication lines N embrace the Internet, computer networks, core networks of communication carriers, and local networks. The client terminals 130 embrace mobile terminals, information terminals (PDA etc.), and personal computers.

Figure 2:
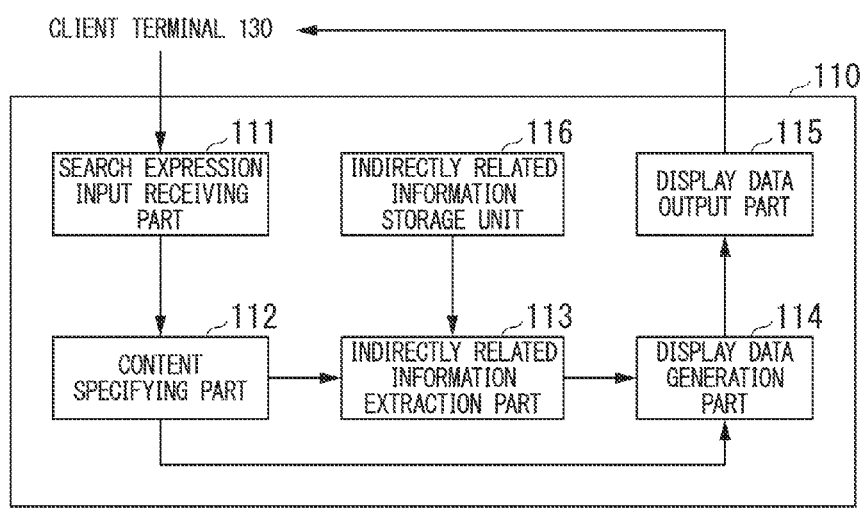
FIG. 2 is a block diagram of the related information presentation device according to the first embodiment.

FIG. 2 is a block diagram of the related information presentation device 110 according to the first embodiment. The related information presentation device 110 includes a search expression input receiving part 111, a content specifying part 112, an indirectly related information extraction part 113, a display data generation part 114, a display data output part 115, and an indirectly related information storage unit 116. The search expression input receiving part 111 receives a user's input of a search expression. The simplest search expressions may solely include character strings serving as keywords, but it is possible to designate a plurality of keywords combined with logical conditions such as logical products and logical sums. When the search expression input receiving part 111 receives a user's input of a search expression, the content specifying part 112 specifies a single content based on the search expression. The indirectly related information extraction part 113 extracts content information which is stored in the indirectly related information storage unit 116 in connection with the content information specified by the content specifying part 112. The display data generation part 114 generates display data representing a graph connecting between a node representing the content information specified by the content specifying part 112 and a node representing the content information extracted by the indirectly related information extraction part 113 via an edge. The display data output part 115 outputs the display data generated by the display data generation part 114.

The indirectly related information storage unit 116 stores a plurality of contents, which are not directly related to each other but which are assumed to be indirectly related to each other via the same content directly related thereto, in connection with content information. For example, a plurality of contents not directly related to each other may refer to the relationship between A company and B company which have not carried out any transactions with each other. Herein, it is possible to assume that A company and B company not directly related to each other could be indirectly related to each other via individuals or proprietors when a plurality of individuals or proprietors have frequently contacted A company and B company. Additionally, it is possible to assume that A company and B company not directly related to each other could be indirectly related to each other via text files, worksheet files, or presentation files when a plurality of text files, worksheet files, or presentation files have described any materials related to A company and B company. Moreover, it is possible to assume that A company and B company not directly related to each other could be indirectly related to each other via text files, worksheet files, or presentation files when a plurality of text files, worksheet files, or presentation files have referred to A company along with predetermined keywords while other text files, worksheet files, or presentation files have referred to B company along with the same keywords as A company.

Figure 3:
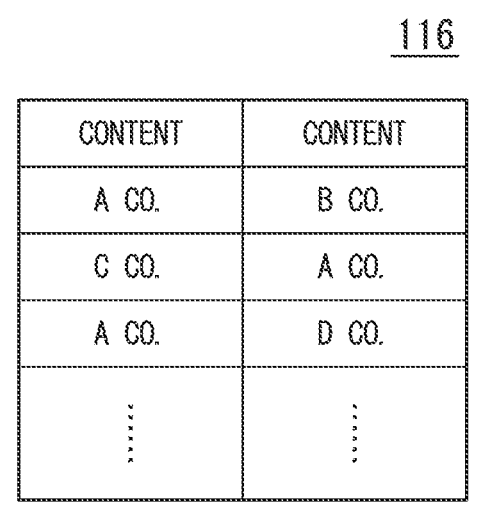

FIG. 3 shows a plurality of content information in a table form stored in the indirectly related information storage unit 116. The indirectly related information storage unit 116 stores two types of content information in connection with each other. In FIG. 3, it is assume that A company and B company not directly related to each other could be indirectly related to each other via the same relevant content directly related to those companies.

Figure 4:
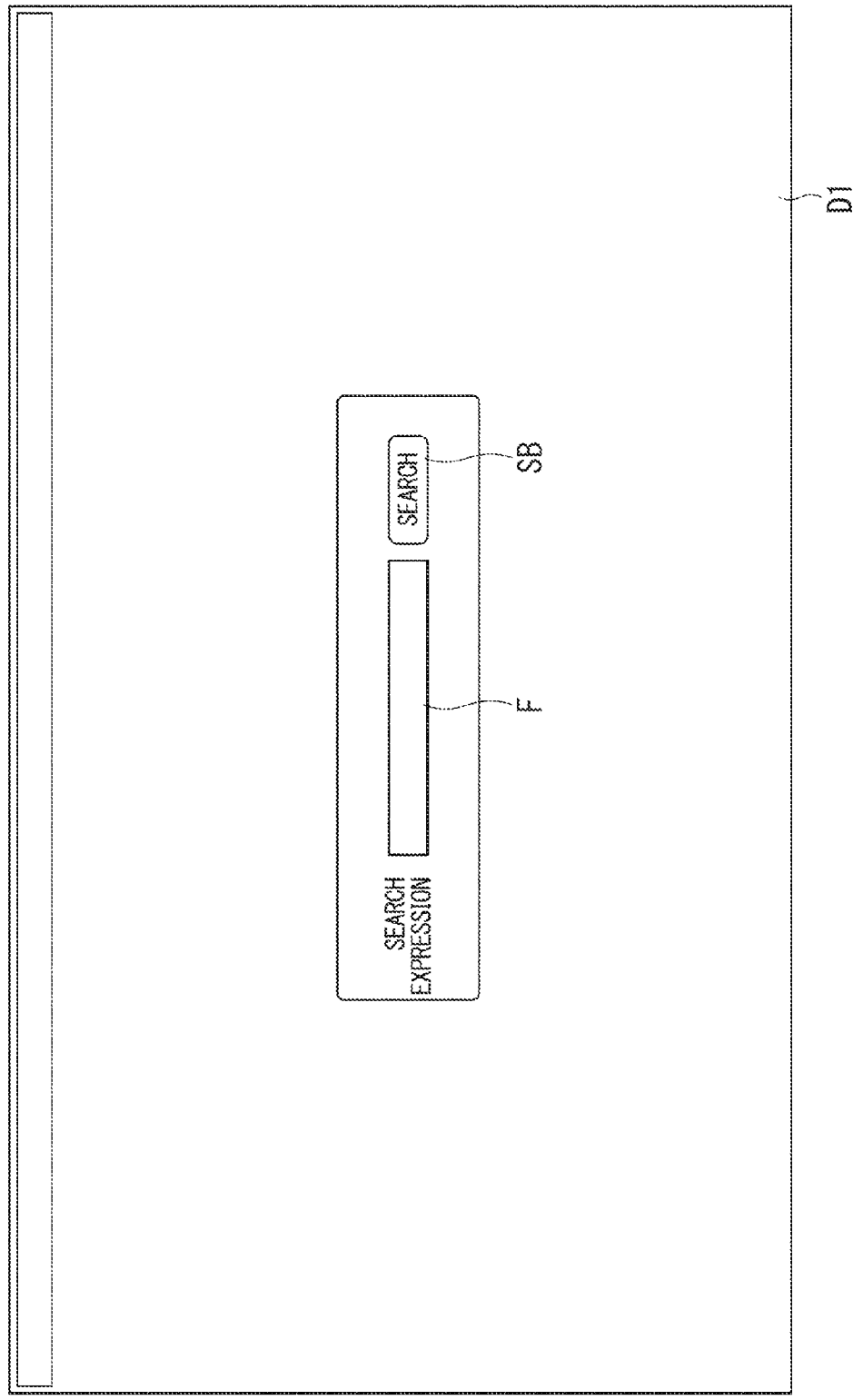
FIG. 4 shows a screen displayed on a client terminal when a user inputs a search expression by means of the related information presentation device of the first embodiment.

FIG. 4 shows a screen D1 which is displayed when each user inputs a search expression. The screen D1 displays a search form F and a search button B. The search form F receives a user's input of a search expression. The search button B is operated to carry out a search process based on the user's inputted search expression.

Figure 5:
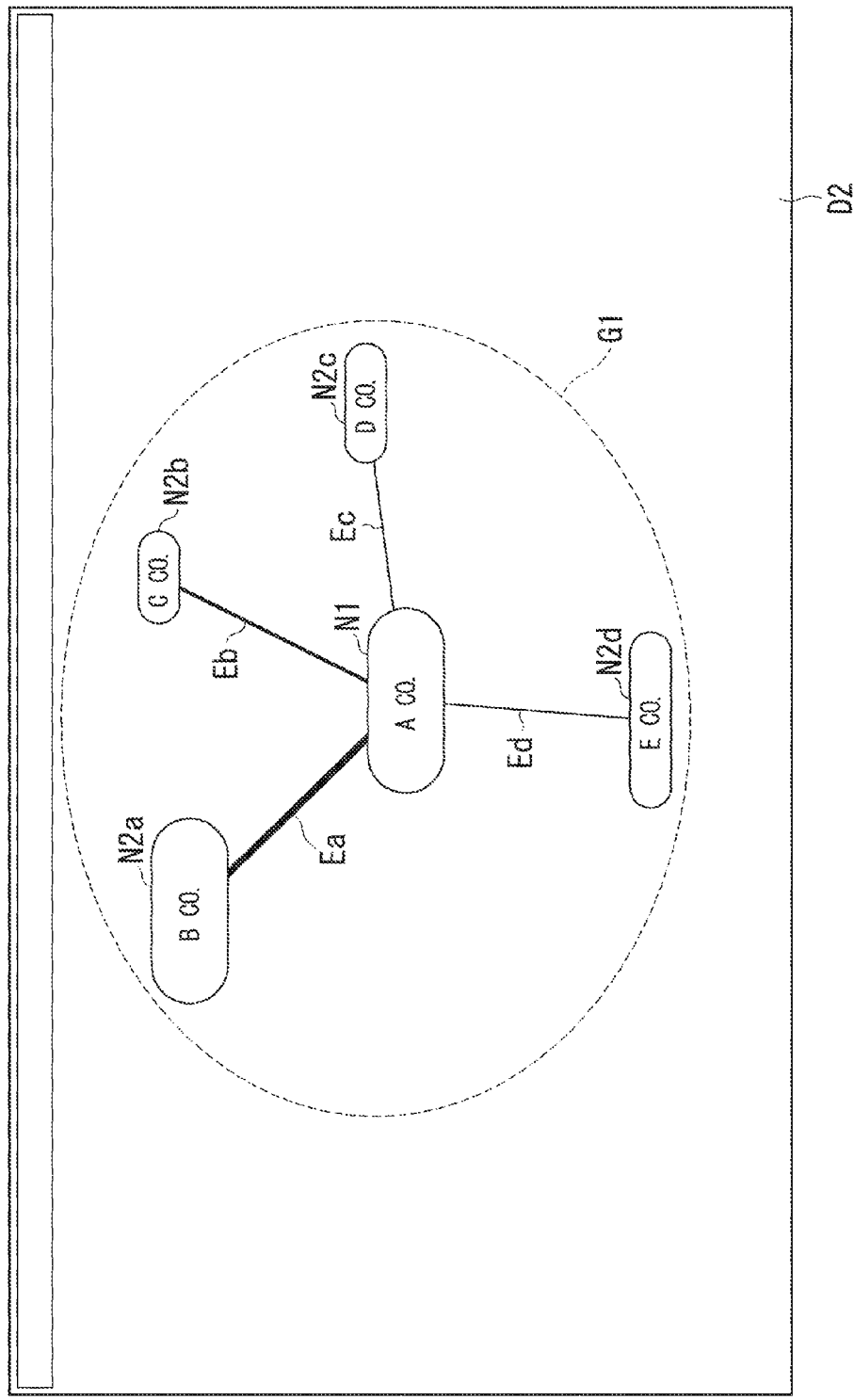
FIG. 5 shows a screen displayed on a client terminal by means of the related information presentation device of the first embodiment.

FIG. 5 shows a screen D2 configured to display search results. The screen D2 displays a graph G1 including a node N1, a plurality of nodes N2 (e.g. nodes N2a, N2b, N2c, and N2d), and a plurality of edges E (e.g. edges Ea, Eb, Ec, and Ed). The node N1 indicates the content information specified by the content specifying part 112. The node N2 indicates the content information extracted by the indirectly related information extraction part 113. The edge E is a line connecting between two nodes.

Figure 6:
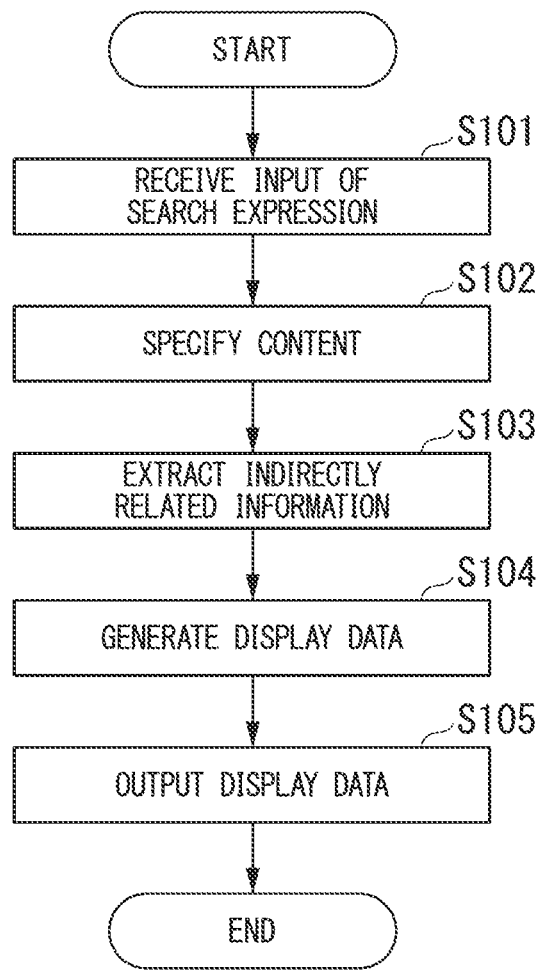
FIG. 6 is a flowchart showing the operation of the related information presentation device of the first embodiment.

FIG. 6 is a flowchart showing the operation of the related information presentation device 110. The flowchart of FIG. 6 shows a series of processes ranging from a process of receiving a user's input of a search expression to a process of outputting display data in the related information presentation device 110. The operation of the related information presentation device 110 will be described in detail with reference to FIGS. 1 to 6.

In order for the related information presentation device 110 to search desired content information, each user carries out a predetermined operation with a Web browser of the client terminal 130 so as to access a search Web page. Upon receiving a user's operation, the client terminal 130 transmits a transmission request for a search Web page to the related information presentation device 110. Upon receiving a transmission request from the client terminal 130, the related information presentation device 110 transmits data representing a search Web page to the client terminal 130. Thus, the client terminal 130 displays a screen D1 (see FIG. 4) according to a Web browser on screen. Each user may input a search expression to the search form F on the screen D1. Herein, each user may input an explicit search expression or a fuzzy search expression to the search form F. When each user operates the search button SB, the client terminal 130 transmits a search expression input to the search form F to the related information presentation device 110. In FIG. 6, upon receiving a search expression transmitted from the client terminal 130, the search expression input receiving part 111 of the related information presentation device 110 forwards the search expression to the content specifying part 112 (step S101).

Upon receiving a search expression from the search expression input receiving part 111, the content specifying part 112 of the related information presentation device 110 specifies a single content based on the search expression (step S102). Upon receiving a search expression including a character string representing a keyword of "A company", for example, the content specifying part 112 specifies a content of "A company" (see FIG. 3) matching the keyword of "A company". Upon receiving a search expression combined with a search condition indicating a logical product on a plurality of keywords of "company", "social networking service", and "industry leader", the content specifying part 112 searches and specifies any contents matching the search condition. At this time, the content specifying part 112 may carry out a search process with reference to an information source stored in the related information presentation device 110. Alternatively, the content specifying part 112 may carry out a search process with reference to information sources stored in other computers which are accessible via communication lines N. Then, the content specifying part 112 sends the specified content information to the indirectly related information extraction part 113 and the display data generation part 114.

Upon receiving the content information specified by the content specifying part 112, the indirectly related information extraction part 113 of the related information presentation device 110 extracts content information correlated to the specified content information among a plurality of content information stored in the indirectly related information storage unit 116 (step S103). Herein, the indirectly related information extraction part 113 may extract a plurality of content information. Then, the indirectly related information extraction part 113 sends the extracted content information to the display data generation part 114.

The display data generation part 114 of the related information presentation device 110 receives the content information specified by the content specifying part 112 and the content information extracted by the indirectly related information extraction part 113. The display data generation part 114 generates display data representing a graph G1 connecting between a node N1 representing the content information specified by the content specifying part 112 and a node N2 representing the content information extracted by the indirectly related information extraction part 113 via an edge E (step S104). The display data generation part 114 sends the display data to the display data output part 115.

Upon receiving display data from the display data generation part 114, the display data output part 115 of the related information presentation device 110 transmits the display data to the client terminal 130 (step S105). Thus, the client terminal 130 displays a screen D2 (see FIG. 5) according to a Web browser on screen.

As described above, the related information presentation device 110 stores a plurality of contents in connection with each other when a plurality of contents not directly related to each other is assumed to be indirectly related to each other via the same content directly related thereto. Upon receiving a user's input of a search expression with the client terminal 130, the related information presentation device 110 specifies single content information based on the search expression. The related information presentation device 110 extracts content information correlated to the specified content information among a plurality of content information stored therein. Then, the related information presentation device 110 generates display data representing a graph G1 connecting between a node N1 representing the specified content information and a node N2 representing the extracted content information via an edge E. Thereafter, the related information presentation device 110 transmits the display data to the client terminal 130. The related information presentation device 110 is designed to automatically search content information, which is not directly related to the user's designated content information but which is assumed to be indirectly related to the user's designated content information via the same content information directly related thereto, so as to present it to the user. Thus, it is possible to present each user with useful content information unanticipated by each user.

Second Embodiment

Figures 7, 8:
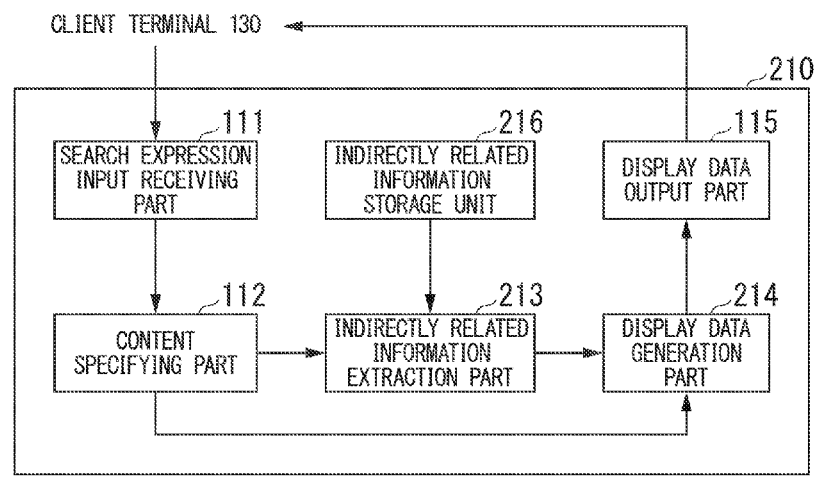
FIG. 7 is a block diagram of a related information presentation device according to a second embodiment of the present invention.
FIG. 8 shows content information and relevant content information in a table form stored in an indirectly related information storage unit of the related information presentation device of the second embodiment 2.

FIG. 7 is a block diagram of a related information presentation device 210 according to the second embodiment of the present invention. The related information presentation device 210 includes a search expression input receiving part 111, a content specifying part 112, an indirectly related information extraction part 213, a display data generation part 214, a display data output part 115, and an indirectly related information storage unit 216. Herein, the detailed descriptions concerning the same constituent elements of the related information presentation device 210 as the constituent elements of the related information presentation device 110 will be omitted.

The indirectly related information extraction part 213 extracts relevant content information in addition to any content information correlated to the content information specified by the content specifying part 112 among a plurality of content information stored in the indirectly related information storage unit 216. The display data generation part 214 generates display data representing a graph connecting a node representing the content information specified by the content specifying part 112, a node representing the content information extracted by the indirectly related information extraction part 213, and a node representing the relevant content information extracted by the indirectly related information extraction part 213 via edges.

The indirectly related information storage unit 116 stores a plurality of content information which are not directly related to each other but which are assumed to be indirectly related to each other via the same content information directly related thereto while storing the same content information as the relevant content information.

FIG. 8 shows a plurality of content information in a table form stored in the indirectly related information storage unit 216. The indirectly related information storage unit 216 stores a pair of content information indirectly related to each other in connection with the relevant content information directly related thereto. In FIG. 8, it is assumed that A company and B company not directly related to each other could be indirectly related to each other via "A division", "B division", or "text file A".

Figure 9:
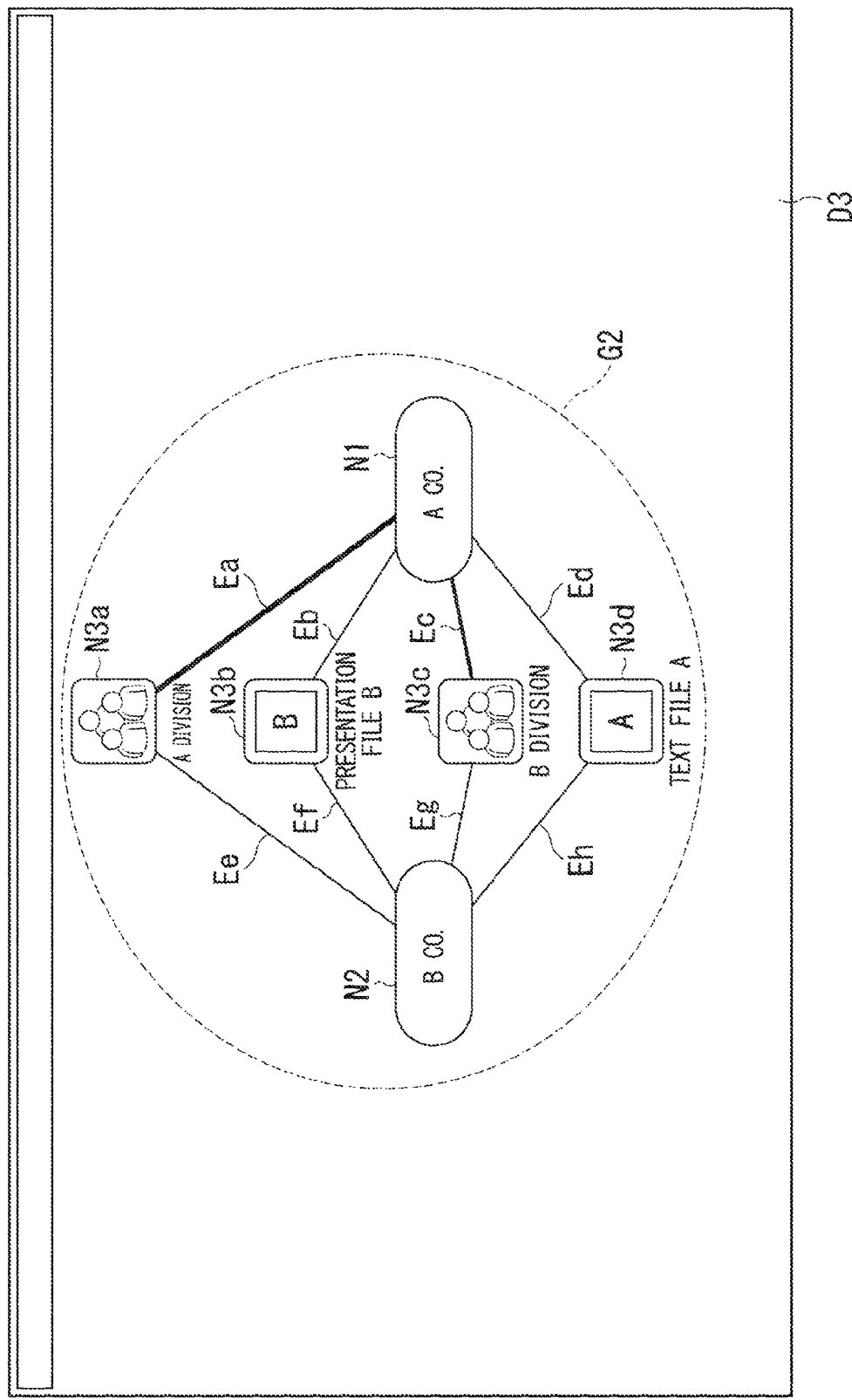
FIG. 9 shows a screen displaying a search result on a client terminal by means of the related information presentation device of the second embodiment.

FIG. 9 shows a screen D3 of the client terminal 130 displaying the display data (i.e. search results based on user's search expressions) transmitted from the related information presentation device 210. The screen D3 displays a graph G2 including a node N1, a node N2, a plurality of nodes N3 (i.e. nodes N3a, N3b, N3c, and N3d), and a plurality of edges E (i.e. edges Ea, Eb, Ec, Ed, Ef, Eg, and Eh). The node N1 indicates the content information specified by the content specifying part 112. The node N2 indicates the content information extracted by the indirectly related information extraction part 113. The node N3 indicates the relevant content information extracted by the indirectly related information extraction part 113. The edge E is a line connecting between two nodes.

Figure 10:
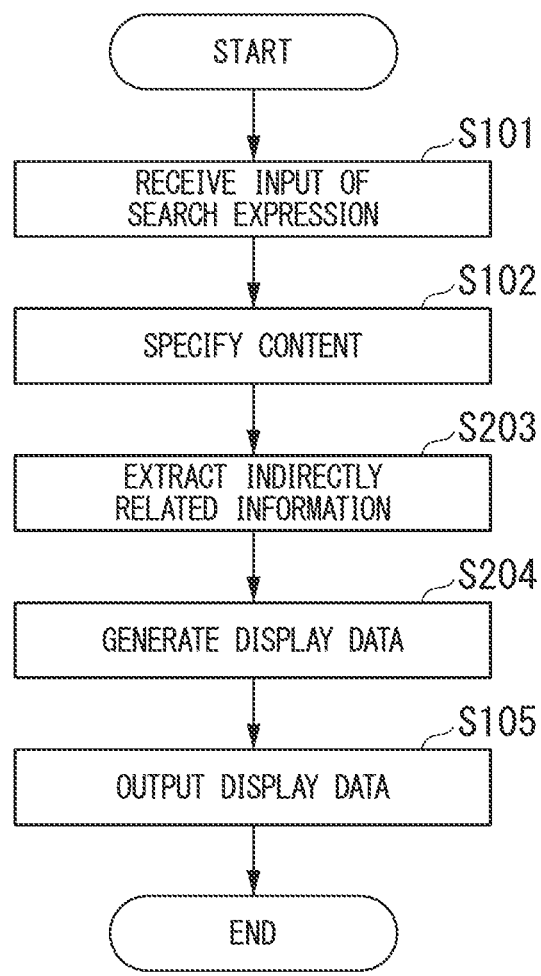
FIG. 10 is a flowchart showing the operation of the related information presentation device of the second embodiment.

FIG. 10 is a flowchart showing the operation of the related information presentation device 210. The flowchart of FIG. 10 shows a series of processes ranging from a process of receiving a user's input of a search expression to a process of outputting display data in the related information presentation device 210. The operation of the related information presentation device 210 will be described in detail with reference to FIGS. 7 to 10. In FIG. 10, the descriptions regarding steps S101 and S102 similar to those of FIG. 6 will be omitted.

Upon receiving the content information specified by the content specifying part 112, the indirectly related information extraction part 213 of the related information presentation device 210 extracts the content information, correlated to the specified content information among a plurality of content information stored in the indirectly related information storage unit 116, and its relevant content information (step S203). Herein, the indirectly related information extraction part 213 may extract multiple pairs of content information and relevant content information. Then, the indirectly related information extraction part 213 sends the display data representing the extracted content information and the relevant content information to the display data generation part 214.

Upon receiving the content information specified by the content specifying part 112, the content information and the relevant content information extracted by the indirectly related information extraction part 213, the display data generation part 214 of the related information presentation device 210 generates display data representing a graph G2 connecting a node N1 representing the specified content information, a node N2 representing the extracted content information, and a node N3 representing the extracted relevant content information via edges E (step S204). Then, the display data generation part 214 sends the display data to the display data output part 115 (step S105). The client terminal 130 displays the screen D3 (see FIG. 9) according to a Web browser based on the display data transmitted from the related information presentation device 210.

As described above, the related information presentation device 210 stores a plurality of content information, which are not directly related to each other but which are assumed to be indirectly related to each other via the same relevant content information directly related thereto, in connection with the relevant content information. Additionally, the related information presentation device 210 extracts any content information, correlated to the content information specified via a user's search expression, and its relevant content information. Then, the related information presentation device 210 generates display data representing a graph G2 connecting a node N1 representing the specified content information, a node N2 representing the extracted content information, and a node N3 representing the extracted relevant content information via edges E. Thus, the related information presentation device 210 is designed to present each user with a plurality of content information, which are not directly related to the desired content information designated by each user but which are assumed to be indirectly related to the desired content information via the same relevant content information directly related thereto, as useful content information unanticipated by each user as well as the relevant content information.

Third Embodiment

Figures 11, 12:
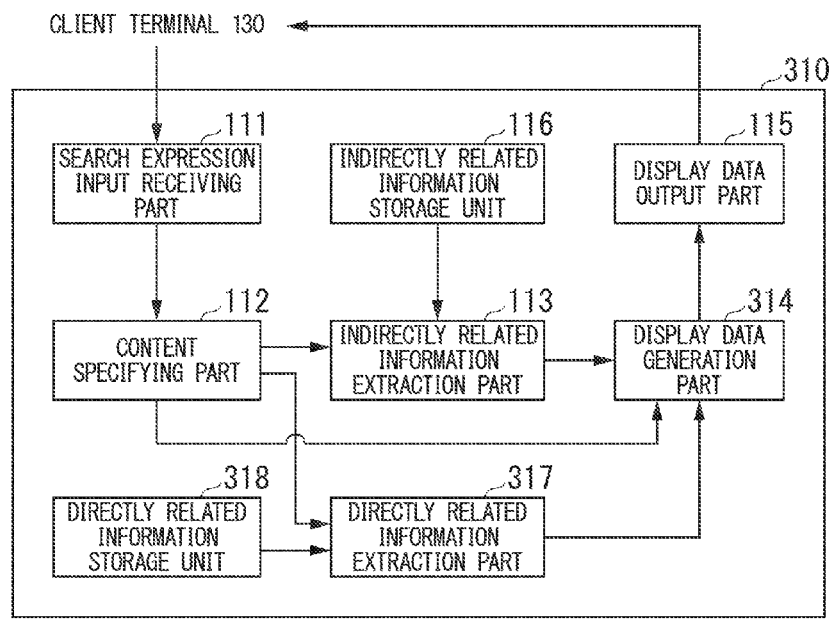
FIG. 11 is a block diagram of a related information presentation device according to a third embodiment of the present invention.
FIG. 12 shows content information in a table form stored in a directly related information storage unit of the related information presentation device of the third embodiment.

FIG. 11 is a block diagram of a related information presentation device 310 according to the third embodiment of the present invention. The related information presentation device 310 includes a search expression input receiving part 111, a content specifying part 112, an indirectly related information extraction part 113, a display data generation part 314, a display data output part 115, an indirectly related information storage unit 116, a directly related information extraction part 317, and a directly related information storage unit 318. Herein, the same reference signs are applied to the same constituent elements of the related information presentation device 310 as the constituent elements of the related information presentation device 110; hence, the descriptions thereof will be omitted as necessary.

The directly related information extraction part 317 extracts any content information, correlated to the content information specified by the content specifying part 112, among a plurality of content information stored in the directly related information storage unit 318. The display data generation part 314 generates display data representing a graph connecting a node representing the content information specified by the content specifying part 112, a node representing the content information extracted by the indirectly related information extraction part 113, and a node representing the content information extracted by the directly related information extraction part 317 via edges.

The directly related information storage unit 318 stores a plurality of directly related content information in connection with each other. When A company has directly contacted A division, for example, it is assumed that A company could be directly related to A division. Additionally, when text files, worksheet files, or presentation files refer to A company along with a keyword A, it is assumed that A company could be directly related to the keyword A.

FIG. 12 shows content information in a table form stored in the directly related information storage unit 318. The directly related information storage unit 318 stores a pair of content information in connection with each other. In FIG. 12, it is assumed that A company could be directly related to A division.

Figure 13:
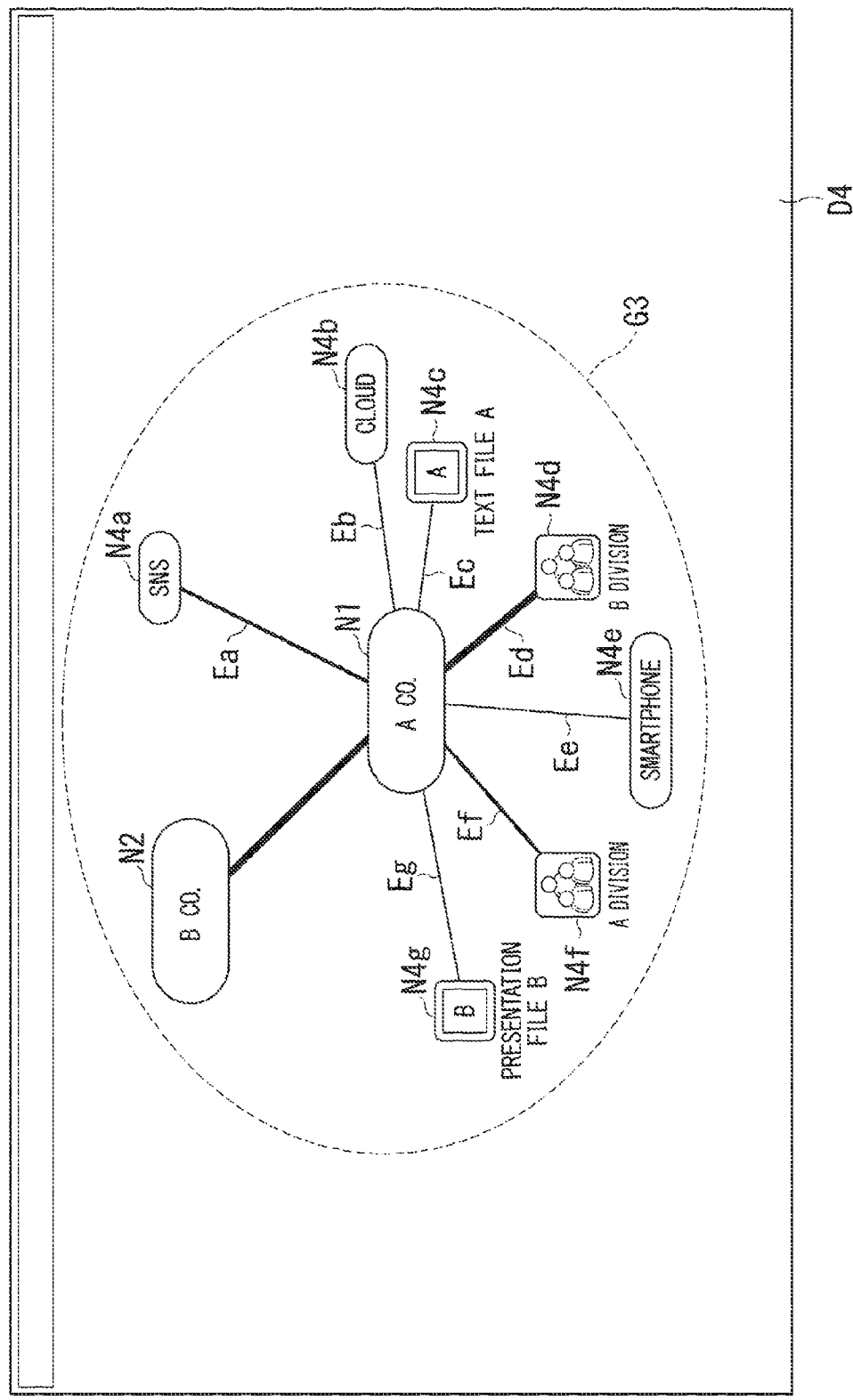
FIG. 13 shows a screen displaying a search result on a client terminal by means of the related information presentation device of the third embodiment.

FIG. 13 shows a screen D4 configured to display search results according to user's search expressions. The screen D4 displays a graph G3 including a node N1, a node N2, a plurality of nodes N4 (i.e. nodes N4a to N4g), and a plurality of edges E (i.e. edge Ea to Eg). The node N1 indicates the content information specified by the content specifying part 112. The node N2 indicates the content information extracted by the indirectly related information extraction part 113. The node N4 indicates the content information extracted by the directly related information extraction part 317. The edge E is a line connecting between two lines.

Figure 14:
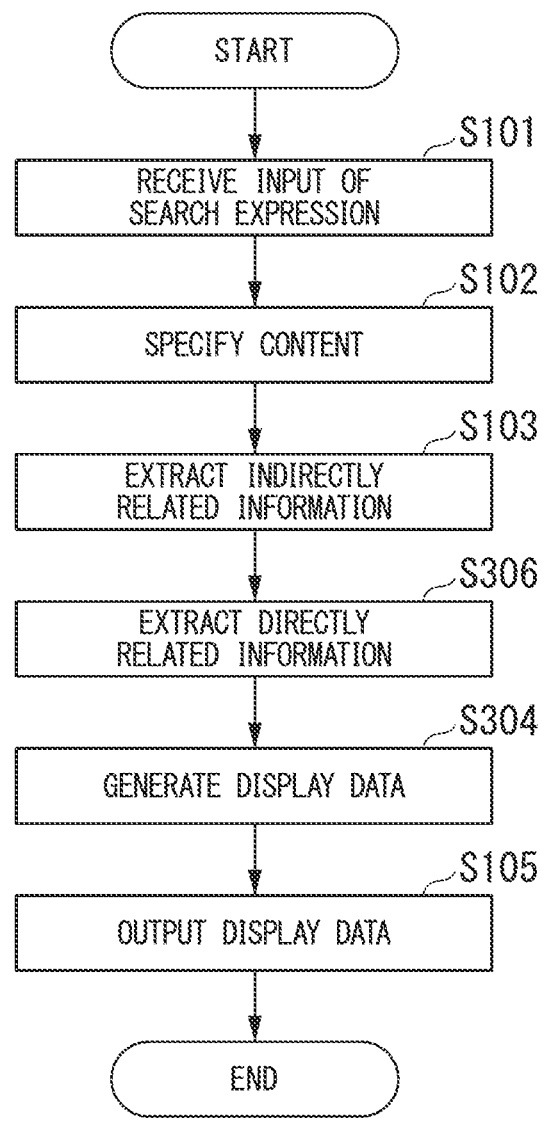
FIG. 14 is a flowchart showing the operation of the related information presentation device of the third embodiment.

FIG. 14 is a flowchart showing the operation of the related information presentation device 310. The flowchart of FIG. 14 shows a series of processes ranging from a process of receiving a user's input of a search expression to a process of outputting display data in the related information presentation device 310. The operation of the related information presentation device 310 will be described in detail with reference to FIGS. 1 to 14. In FIG. 14, steps S101 to S103 and S105 are identical to those of FIG. 6; hence, the descriptions thereof will be omitted as necessary.

The content specifying part 112 of the related information presentation device 310 specifies content information so as to send the content information to the indirectly related information extraction part 113, the directly related information extraction part 317, and the display data generation part 314 (step S102). The directly related information extraction part 317 of the related information presentation device 310 extracts any content information correlated to the content information specified by the content specifying part 112 among a plurality of content information stored in the directly related information storage part 318 (step S306). Then, the directly related information extraction part 317 sends the extracted content information to the display data generation part 314.

The display data generation part 314 of the related information presentation device 310 receives the content information specified by the content specifying part 112, the content information extracted by the indirectly related information extraction part 113, and the content information extracted by the directly related information extraction part 317. Then, the display data generation part 314 generates display data representing a graph G3 connecting a node N1 representing the content information specified by the content specifying part 112, a node N2 representing the content information extracted by the indirectly related information extraction part 113, and a node N4 representing the content information extracted by the directly related information extraction part 317 via edges E (step S304). The display data generation part 314 sends the display data to the display data output part 115 (step S105). The client terminal 130 displays a screen D4 (see FIG. 13) according to a Web browser based on the display data transmitted from the related information presentation device 310.

As described above, the related information presentation device 310 stores a plurality of directly related content information in connection with each other. The related information presentation device 310 extracts any content information correlated to the content information specified by a user's search expression. The related information presentation device 310 generates display data representing a graph G3 connecting a node N1 representing the specified content information and a node N4 representing the extracted content information via edges E. Thus, the related information presentation device 310 can present each user with a plurality of content information, which is stored in connection with the desired content information designated by each user and which is directly related to each other without intervention of relevant content information, as useful content information unanticipated by each user.

Fourth Embodiment

Figures 15, 16:
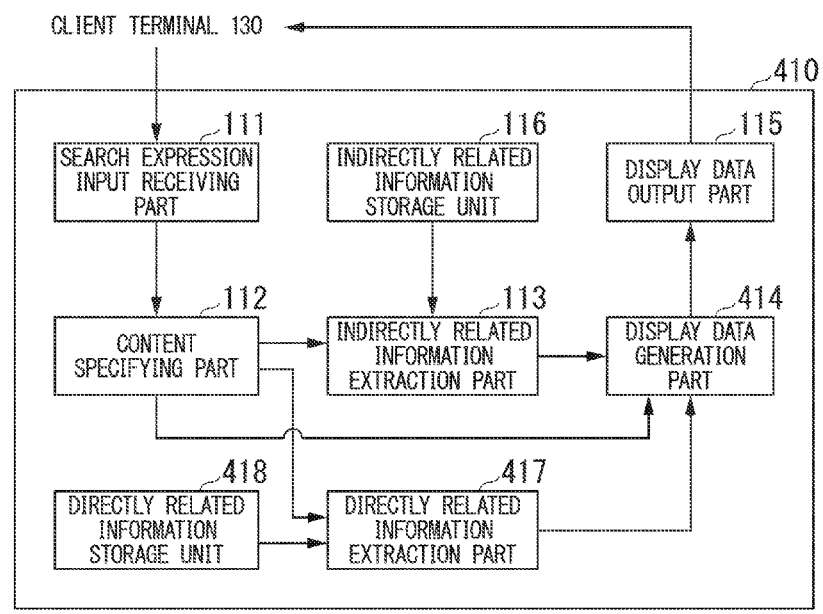
FIG. 15 is a block diagram of a related information presentation device according to a fourth embodiment of the present invention.
FIG. 16 shows content information in a table form stored in a directly related information storage unit of the related information presentation device of the fourth embodiment.

FIG. 15 is a block diagram of a related information presentation device 410 according to a fourth embodiment of the present invention. The related information presentation device 410 includes a search expression input receiving part 111, a content specifying part 112, an indirectly related information extraction part 113, a display data generation part 414, a display data output part 115, an indirectly related information storage unit 116, a directly related information extraction part 417, and a directly related information storage unit 418. Herein, the same reference signs are applied to the same constituent elements of the related information presentation device 410 as the constituent elements of the related information presentation device 110; hence, the descriptions thereof will be omitted as necessary.

The directly related information extraction part 417 extracts any content information and keywords, which are stored in connection with the content information specified by the content specifying part 112, from the stored information of the directly related information storage unit 418. The display data generation part 414 generates display data representing a graph which connects a node representing the content information specified by the content specifying part 112, a node representing the content information extracted by the indirectly related information extraction part 113, and a node representing the content information extracted by the directly related information extraction part 417 via edges and which further superposes a balloon representing a keyword extracted by the directly related information extraction part 417 on an edge connecting two nodes.

The directly related information storage unit 418 stores a plurality of directly related content information in connection with keywords related thereto. When A company contacts A division with respect to any topics about accounting, for example, it is possible to determine that a keyword relating to A company and A division would be "account".

Figure 17:
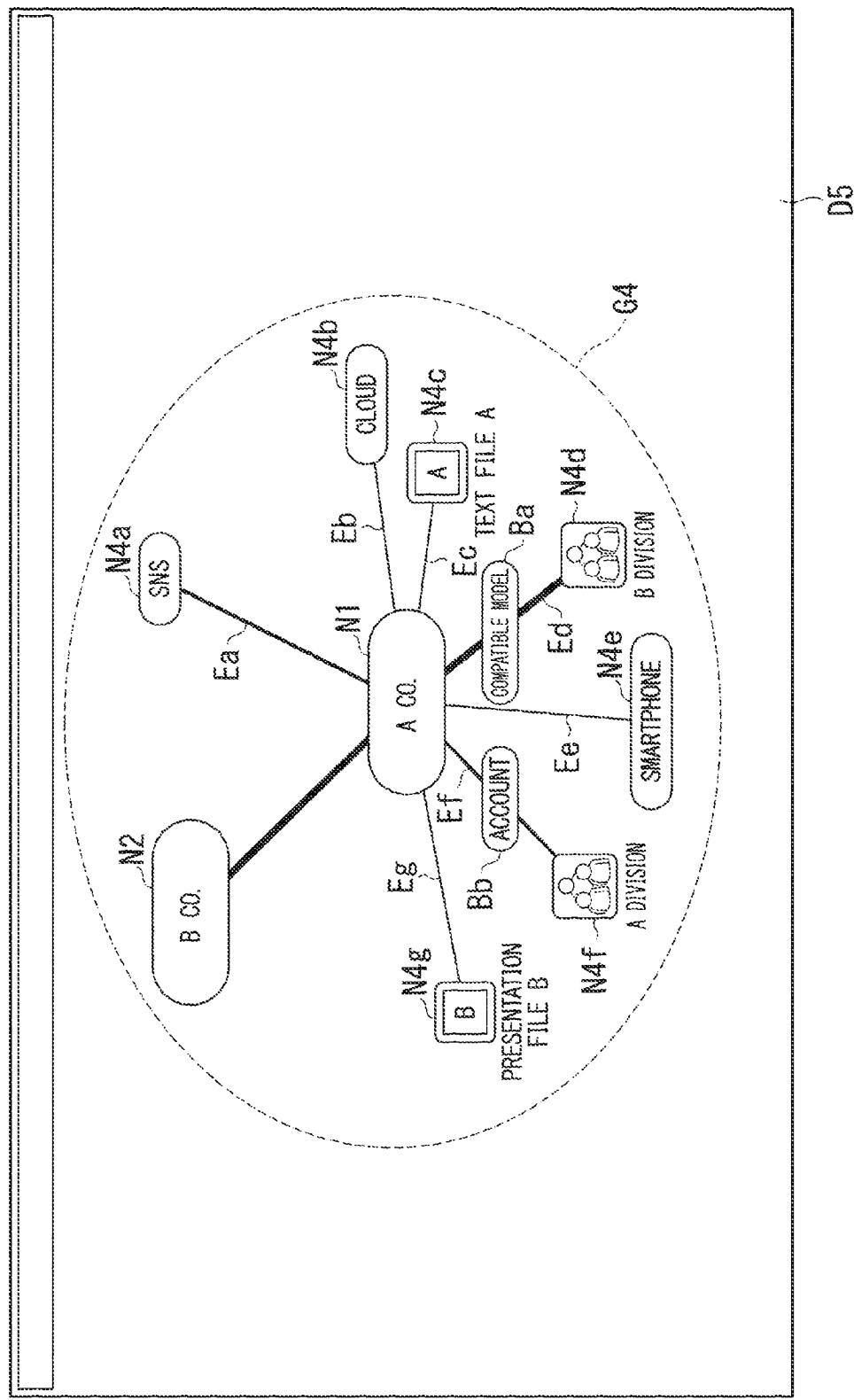
FIG. 17 shows a screen displaying a search result on a client terminal by means of the related information presentation device of the fourth embodiment.

FIG. 17 shows a screen D5 configured to display search results produced by the related information presentation device 410. The screen D5 displays a graph G4 including a node N1, a node N2, a plurality of nodes N4 (i.e. nodes N4a to N4g), a plurality of edges E (i.e. edges Ea to Eg), and a plurality of balloons B (i.e. balloons Ba, Bb). The node N1 indicates the content information specified by the content specifying part 112. The node N2 indicates the content information extracted by the indirectly related information extraction part 113. The node N4 indicates the content information extracted by the directly related information extraction part 317. The edge E is a line connecting two edges. The balloon B indicates a keyword relating to both the nodes N1 and N4.

Figure 18:
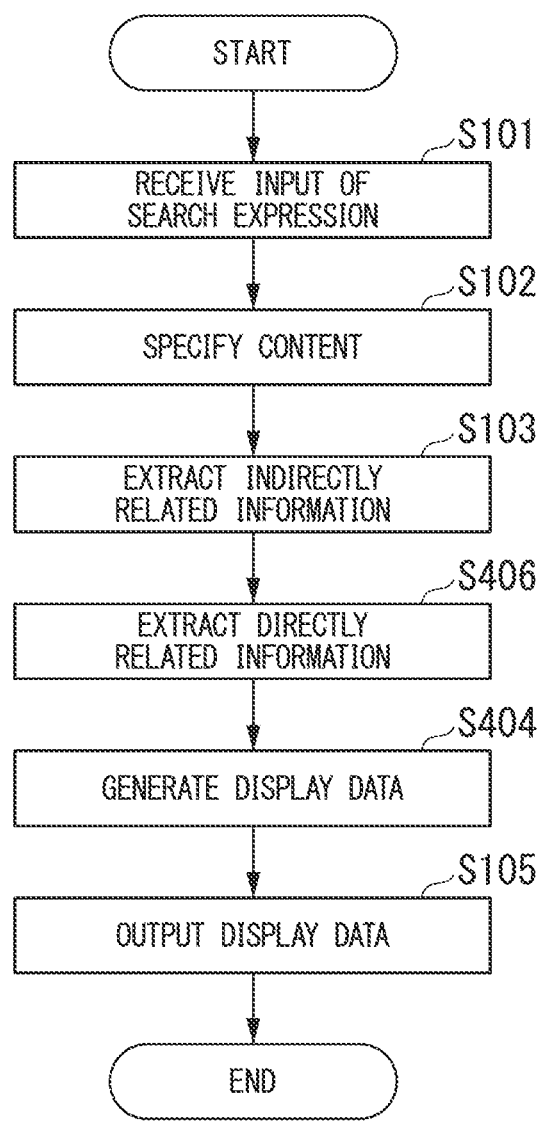
FIG. 18 is a flowchart showing the operation of the related information presentation device of the fourth embodiment.

FIG. 18 is a flowchart showing the operation of the related information presentation device 410. The flowchart of FIG. 18 shows a series of processes ranging from a process of receiving a user's input of a search expression to a process of outputting display data in the related information presentation device 410. The operation of the related information presentation device 410 will be described in detail with reference to FIGS. 15 to 18. In FIG. 18, steps S101 to S103 and S105 are identical to those of FIG. 6; hence, the descriptions thereof will be omitted as necessary.

The content specifying part 112 of the related information presentation device 410 specifies content information so as to send the content information to the indirectly related information extraction part 113, the directly related information extraction part 417, and the display data generation part 414 (step S102).

The directly related information extraction part 417 of the related information presentation device 410 extracts any content information and keywords, which are correlated to the content information specified by the content specifying part 112, from the stored information of the directly related information storage unit 418 (step S406). Then, the directly related information extraction part 417 sends the extracted content information and keywords to the display data generation part 414.

The display data generation part 414 of the related information presentation device 410 receives the content information specified by the content specifying part 112, the content information extracted by the indirectly related information extraction part 113, and the content information and keywords extracted by the directly related information extraction part 417. Then, the display data generation part 414 generates display data representing a graph G4 which connects a node N1 representing the content information specified by the content specifying part 112, a node N2 representing the content information extracted by the indirectly related information extraction part 113, and a node N4 representing the content information extracted by the directly related information extraction part 417 via edges E and which superposes balloons B, representing keywords extracted by the directly related information extraction part 417, on the edges E (step S404). The display data generation part 414 sends the display data to the display data output part 115 (step S105). The client terminal 130 displays a screen D5 (see FIG. 17) according to a Web browser based on the display data transmitted from the related information presentation device 410.

As described above, the related information presentation device 410 stores a plurality of directly related content information in connection with keywords related thereto. The related information presentation device 410 further extracts keywords which are stored in connection with the content information, specified according to a user's search expression, among the stored information. Thereafter, the related information presentation device 410 generates display data representing a graph G4 which superposes a balloon B, representing a keyword, on an edge connecting two nodes. Thus, the related information presentation device 410 is designed to present a plurality of content information which is not directly related to the desired content information designated by each user but which is assumed to be indirectly related to the desired content information via the same relevant content information directly related thereto. Additionally, it is designed to further present a plurality of content information directly related to the desired content information as well as keywords directly related thereto.

Fifth Embodiment

Figure 19:
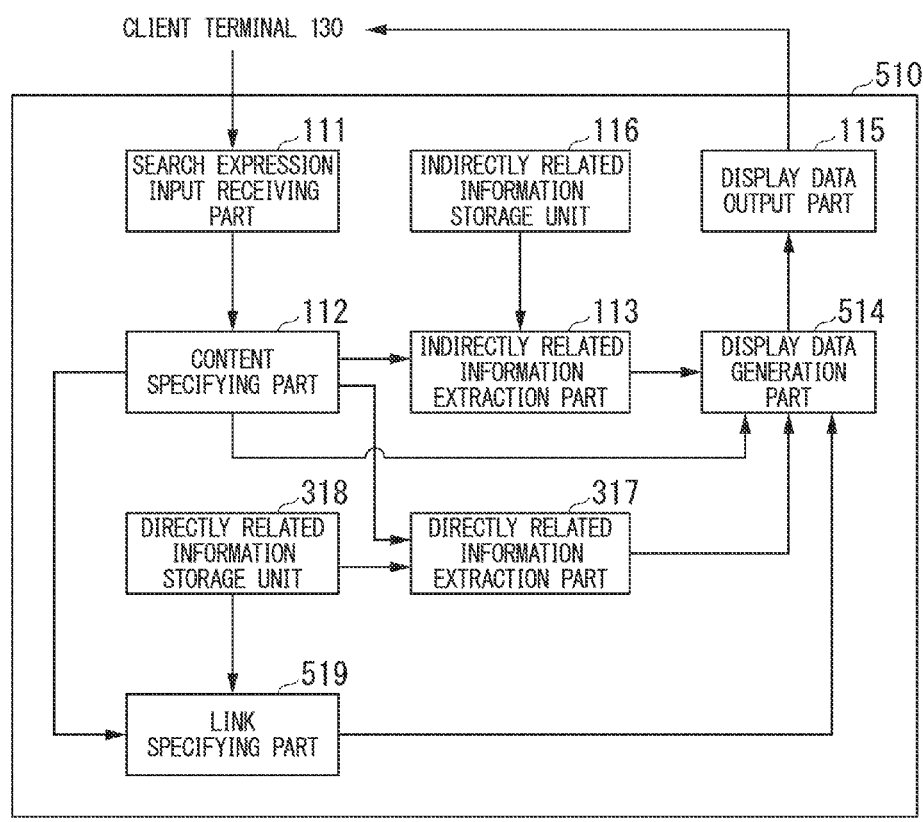
FIG. 19 is a block diagram of a related information presentation device according to a fifth embodiment of the present invention.

FIG. 19 is a block diagram of a related information presentation device 510 according to a fifth embodiment of the present invention. The related information presentation device 510 includes a search expression input receiving part 111, a content specifying part 112, an indirectly related information extraction part 113, a display data generation part 514, a display data output part 115, an indirectly related information storage unit 116, a directly related information extraction part 317, a directly related information storage unit 318, and a link specifying part 519. In the related information presentation device 510, the same reference signs are applied to the same constituent elements as the constituent elements of the related information presentation devices 110 and 310; hence, the descriptions thereof will be omitted as necessary.

The link specifying part 519 sequentially traces a plurality of directly related content information based on the stored information of the directly related information storage unit 318 so as to specify a link concerning a series of content information ranging from the content information specified by the content specifying part to the predetermined content information. When a content A is directly related to a content B, the content B is directly related to a content C, and the content C is directly related to a content D, for example, it is possible to describe a link between a series of contents A to D as "Content A-Content B-Content C-Content D".

The display data generation part 514 generates display data representing a graph, in which a node representing the content information specified by the content specifying part 112 is connected to a node representing the predetermined content information via an intermediate node through edges, in accordance with the link between a series of content information specified by the link specifying part 519.

Figure 20:
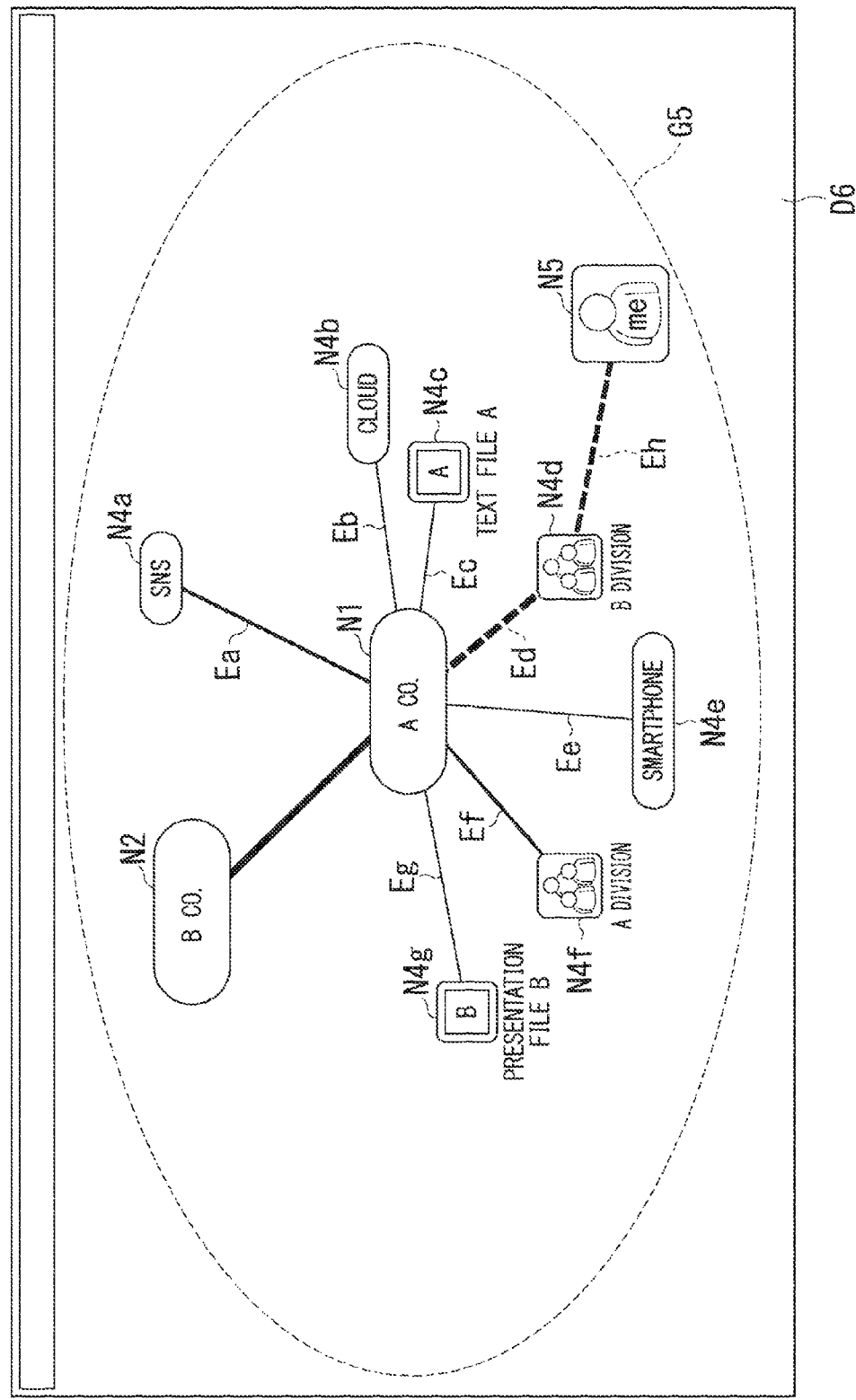
FIG. 20 shows a screen displaying a search result on a client terminal by means of the related information presentation device of the fifth embodiment.

FIG. 20 shows a screen D6 configured to display search results produced by the related information presentation device 510. The screen D6 displays a graph G5 including a node N1, a node N2, a plurality of nodes N4 (i.e. nodes N4a to N4g), a node N5, and a plurality of edges E (i.e. edges Ea to Eh). The node N1 indicates the content information specified by the content specifying part 112. The node N2 indicates the content information extracted by the indirectly related information extraction part 113. The node N4 indicates the content information extracted by the directly related information extraction part 317. The node N5 indicates the predetermined content information. The edge E is a line connecting two nodes.

Figure 21:
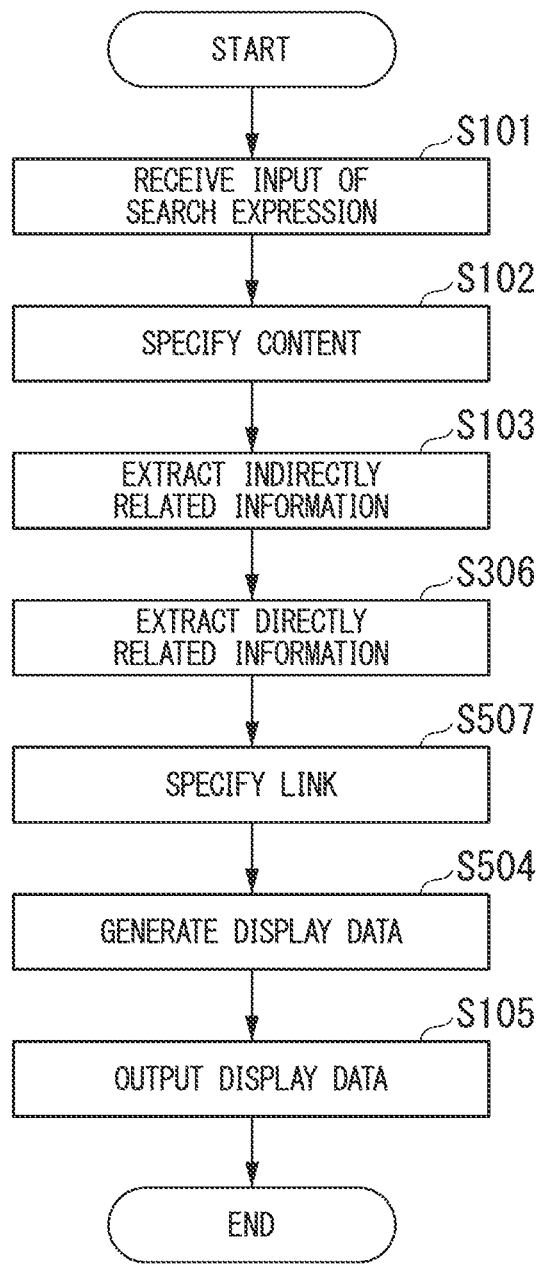
FIG. 21 is a flowchart showing the operation of the related information presentation device of the fifth embodiment.

FIG. 21 is a flowchart showing the operation of a related information presentation device 510. The flowchart of FIG. 21 shows a series of processes ranging from a process of receiving a user's input of a search expression to a process of outputting display data in the related information presentation device 510. The operation of the related information presentation device 510 will be described in detail with reference to FIGS. 19 to 21. In FIG. 21, steps S101 to S103 and S105 are identical to those of FIG. 6; hence, the descriptions thereof will be omitted as necessary.

The content specifying part 112 of the related information presentation device 510 specifies content information so as to send the content information to the indirectly related information extraction part 113, the directly related information extraction part 317, the link specifying part 519, and the display data generation part 514 (step S102).

The link specifying part 519 of the related information presentation device 510 specifies a link between the content information specified by the content specifying part 112 and the predetermined content information by sequentially tracing a plurality of directly related content information based on the stored information of the directly related information storage unit 318 (step S507). It is possible to set the predetermined content information in advance. When the user's own content information is set to the predetermined content information, for example, the link specifying part 519 specifies a link between the content information specified by the content specifying part 112 and the user's own content information. Then, the link specifying part 519 sends data, representing a link between a pair of content information, to the display data generation part 514.

The display data generation part 514 of the related information presentation device 510 receives the content information specified by the content specifying part 112, the content information extracted by the indirectly related information extraction part 113, the content information extracted by the directly related information extraction part 317, and the link data specified by the link specifying part 519. Then, the display data generation part 514 generates display data representing a graph G5 in which a node N1 representing the content information specified by the content specifying part 112, a node N2 representing the content information extracted by the indirectly related information extraction part 113, and a node N4 representing the content information extracted by the directly related information extraction part 317 are connected together via edges E and in which the node N1 to the node N5 representing the predetermined content information are further connected together through other necessary nodes via edges E in accordance with the link specified by the link specifying part 519 (step S504). Then, the display data generation part 514 sends the display data to the display data output part 115 (step S105). The client terminal 130 displays a screen D6 (see FIG. 20) according to a Web browser based on the display data transmitted from the related information presentation device 510.

As described above, the related information presentation device 510 specifies a link between the content information specified according to the user's designated search expression and the predetermined content information based on the stored information by sequentially tracing a plurality of directly related content information. Additionally, the related information presentation device 510 generates display data representing a graph in which the content information specified by the user's designated search expression to the predetermined content information are further connected through other necessary nodes via edges in accordance with the links of the foregoing content information. Thus, the related information presentation device 510 is designed to present any content information, which is not directly related to the desired content information designated by each user but which is indirectly related to the desired content information via the same relevant content information, as useful content information unanticipated by each user. Additionally, it is possible to present a link between the desired content information and the predetermined content information.

Sixth Embodiment

Figure 22:
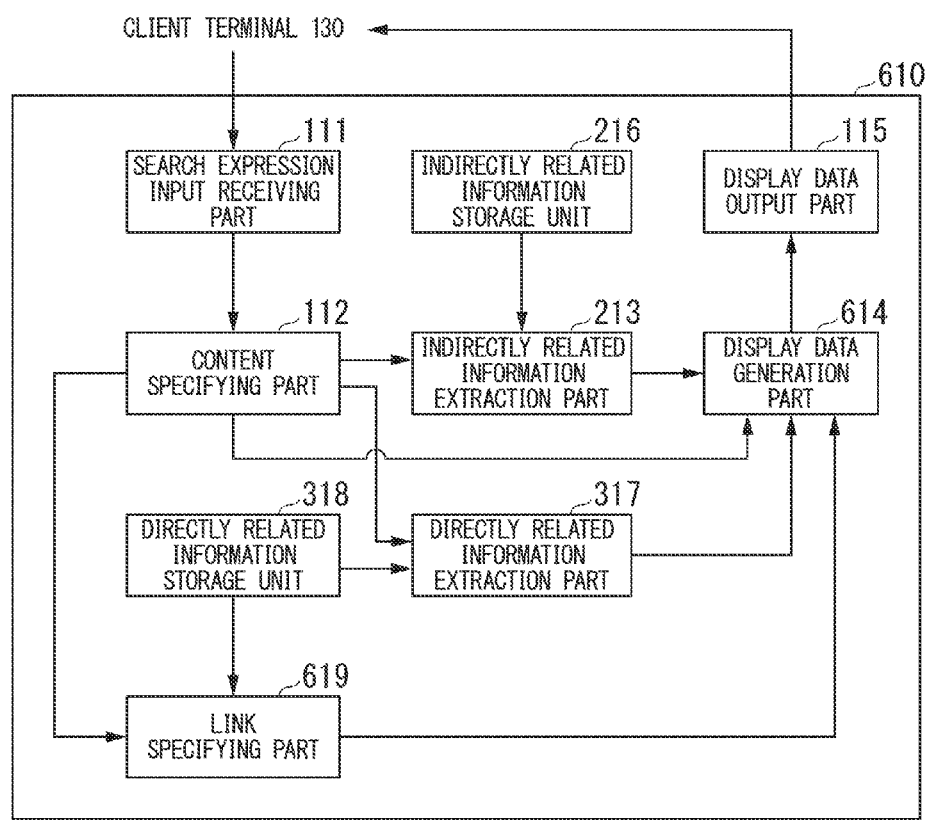
FIG. 22 is a block diagram of a related information presentation device according to a sixth embodiment of the present invention.

FIG. 22 is a block diagram of a related information presentation device 610 according to the sixth embodiment of the present invention. The related information presentation device 610 includes a search expression input receiving part 111, a content specifying part 112, an indirectly related information extraction part 213, a display data generation part 614, a display data output part 115, an indirectly related information storage unit 216, a directly related information extraction part 317, a directly related information storage unit 318, and a link specifying part 619. In the related information presentation device 610, the same reference signs are applied to the same constituent elements as the constituent elements of the related information presentation devices 110, 210, and 310; hence, the descriptions thereof will be omitted as necessary.

The link specifying part 619 specifies a link between the content information specified by the content specifying part 112, the user's selected content information, and the predetermined content information by sequentially tracing a plurality of directly related content information based on the stored content of the directly related information storage unit 318.

The display data generation part 614 generates display data representing a graph in which a node representing the content information specified by the content specifying part 112 is connected to a node representing the content information extracted by the indirectly related information extraction part 213 through a node representing the relevant content information extracted by the indirectly related information extraction part 213 via edges, in which a node representing the content information specified by the content specifying part 112 is connected to a node representing the content information extracted by the directly related information extraction part 317 via an edge, and in which a node representing the content information specified by the content specifying part 112, a node representing the user's selected content information, and a node representing the predetermined content information are connected through nodes representing other necessary content information via edges in accordance with links between a plurality of content information specified by the link specifying part 619.

Figure 23:
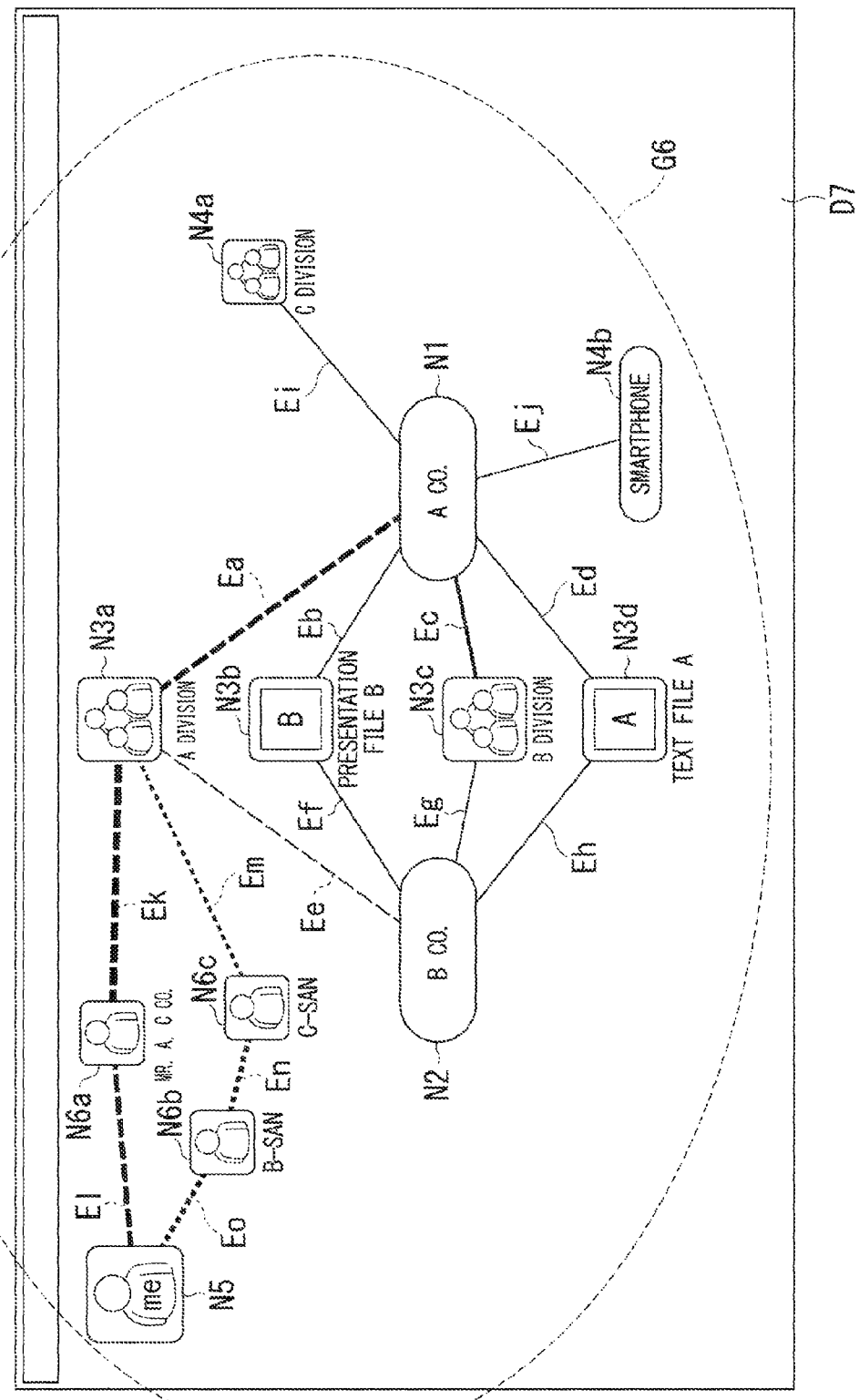
FIG. 23 shows a screen displaying a search result on a client terminal by means of the related information presentation device of the sixth embodiment.

FIG. 23 shows a screen D7 configured to display search results produced by the related information presentation device 610. The screen D7 displays a graph G6 including a node N1, a node N2, a plurality of nodes N3 (i.e. nodes N3a to N3d), a plurality of nodes N4 (i.e. nodes N4a and N4b), a node N5, a plurality of nodes N6 (i.e. nodes N6a to N6c), and a plurality of edges E (i.e. edges Ea to Eo). The nodes N1 indicates the content information specified by the content specifying part 112. The node N2 indicates the content information extracted by the indirectly related information extraction part 113. The node N3 indicates the content information extracted by the indirectly related information extraction part 113. The node N3 indicates the content information extracted by the directly related information extraction part 317. The node N5 indicates the predetermined content information. The node N6 indicates any content information disposed on links established between a plurality of content information specified by the link specifying part 619. The edge E is a line connecting two nodes.

Figure 24:
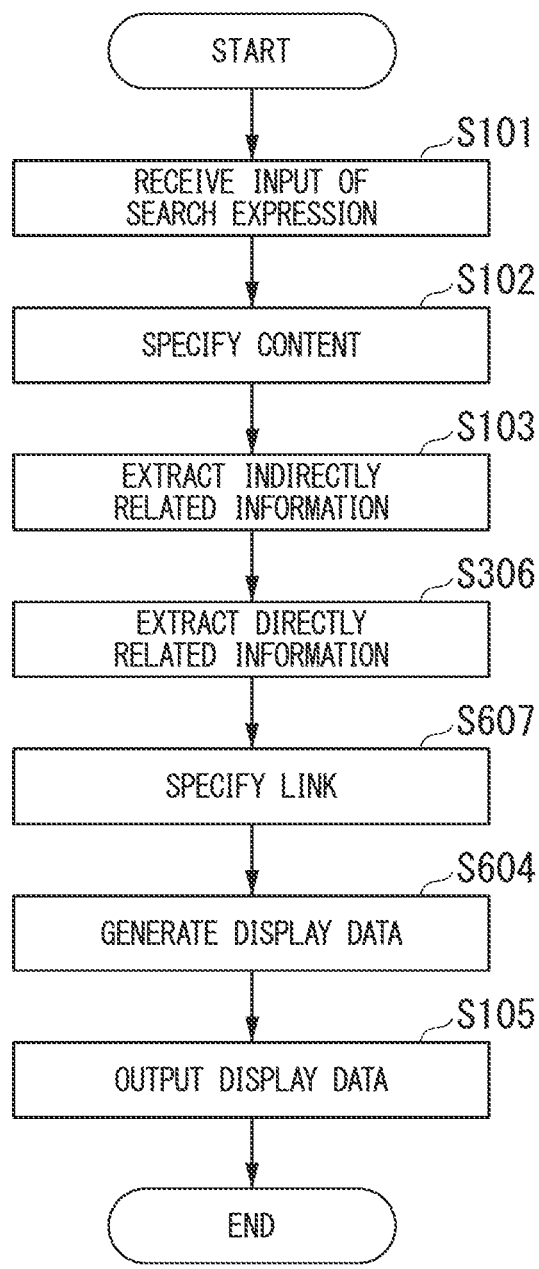
FIG. 24 is a flowchart showing the operation of the related information presentation device of the sixth embodiment.

FIG. 24 is a flowchart showing the operation of the related information presentation device 610. The flowchart of FIG. 24 shows a series of processes ranging from a process of receiving a user's input of a search expression to a process of outputting display data in the related information presentation device 610. The operation of the related information presentation device 610 will be described in detail with reference to FIGS. 22 to 24. In FIG. 24, steps S101 to S103 and S105 are identical to those of FIG. 6; hence, the descriptions thereof will be omitted as necessary.

The content specifying part 112 of the related information presentation device 610 specifies content information according to a user's search expression so as to send the content information to the indirectly related information extraction part 113, the display data generation part 614, the directly related information extraction part 317, and the link specifying part 619. To detect a link between the content information of the node N1, the content information of the node N2, and the user's own content information on the screen D3 (see FIG. 9), for example, it is necessary for each user to select the node N2 displayed on the client terminal 130 and to execute a link search upon a predetermined operation.

Owing to the above operation, the link specifying part 619 of the related information presentation device 610 specifies a link between the content information specified by the content specifying part 112, the user's selected content information, and the predetermined content information by sequentially tracing a plurality of directly related content information based on the stored information of the directly related information storage unit 318 (step S607). In this case, the link specifying part specifies a link between the content information of the node N1, the content information of the node N2, and the user's own content information. Subsequently, the link specifying part 619 sends link data to the display data generation part 614.

The display data generation part 614 receives the content information specified by the content specifying part 112, the content information and the relevant content information extracted by the indirectly related information extraction part 113, the content information extracted by the directly related information extraction part 317, and the link data specified by the link specifying part 619. Then, the display data generation part 614 generates display data representing a graph G6 in which the node N1 representing the content information specified by the content specifying part 112 is connected to the node N2 representing the content information extracted by the indirectly related information extraction part 113 through the node N3 representing the relevant content information extracted by the indirectly related information extraction part 113 via edges, in which the node N1 is connected to the content information extracted by the directly related information extraction part 317 via an edge, and in which the node N1, the node N2 representing the user's selected content information, and the node N5 representing the predetermined content information are connected together through nodes representing other necessary content information via edges in accordance with links specified by the link specifying part 619. The client terminal 130 displays a screen D7 (see FIG. 23) according to a Web browser based on the display data transmitted from the related information presentation device 610.

As described above, the related information presentation device 610 specifies a link between the content information specified according to a user's search expression, the user's selected content information, and the predetermined content information by sequentially tracing a plurality of directly related content information based on the stored information. Then, the related information presentation device 610 generates display data representing a graph in which a node representing the content information specified according to a user's search expression, a node representing the user's selected content information, and a node representing the predetermined content information are connected together through nodes representing other necessary content information via edges in accordance with a link between a plurality of content information specified according to a user's search expression. Thus, the related information presentation device 610 is designed to present the content information, which is not directly related to the desired content information designated by each user but which is indirectly related to the desired content information through the same relevant content information, as useful content information unanticipated by each user. Additionally, it is possible to present a link between the desired content information, the user's selected content information, and the predetermined content information.

Seventh Embodiment

Figure 25:
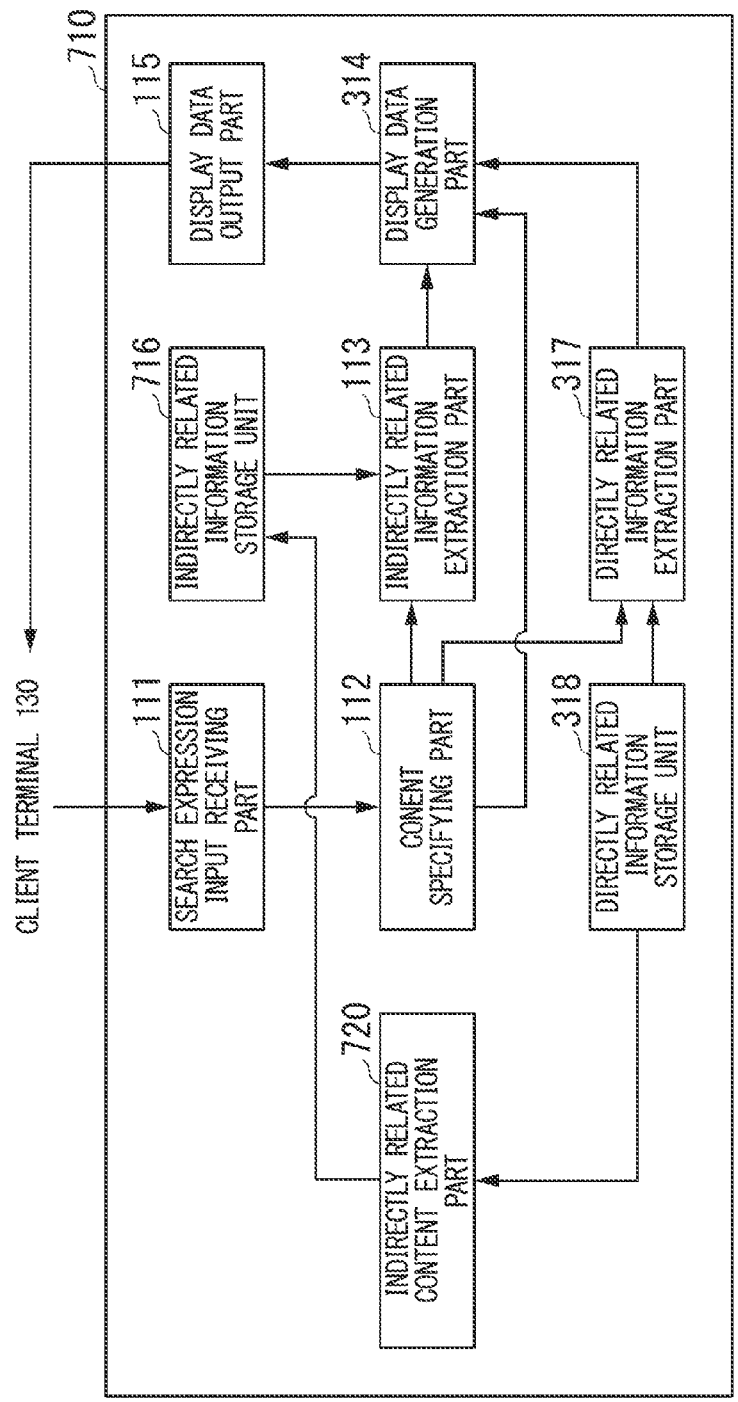
FIG. 25 is a block diagram of a related information presentation device according to a seventh embodiment of the present invention.

FIG. 25 is a block diagram of a related information presentation device 710 according to the seventh embodiment of the present invention. The related information presentation device 710 includes a search expression input receiving part 111, a content specifying part 112, an indirectly related information extraction part 113, a display data generation part 314, a display data output part 115, an indirectly related information storage unit 716, a directly related information extraction part 317, a directly related information storage unit 318, and an indirectly related content extraction part 720. In the related information presentation device 710, the same reference signs are applied to the same constituent elements as the constituent elements of the related information presentation devices 110 and 310; hence, the descriptions thereof will be omitted as necessary.

The indirectly related content extraction part 720 extracts a plurality of content information, which is not directly related to each other but which is assumed to be indirectly related to each other through relevant content information, based on the stored information of the directly related information storage unit 318. The indirectly related information storage unit 716 stores a plurality of content information, extracted by the indirectly related content extraction part 720, in connection with each other.

Figure 26:
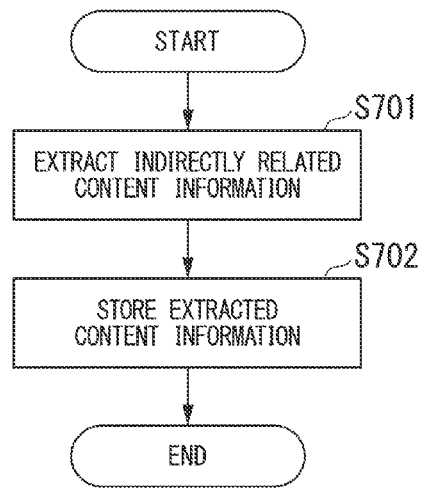
FIG. 26 is a flowchart showing the operation of the related information presentation device of the seventh embodiment.

FIG. 26 is a flowchart showing the operation of the related information presentation device 710. The flowchart shows a series of processes used to extract and store the indirectly related content information. The operation of the related information presentation device 710 will be described with reference FIGS. 25 and 26.

The indirectly related content extraction part 720 a plurality of content information, which is not directly related to each other but which is assumed to be indirectly related to each other through the same relevant content information, based on the stored information of the directly related storage unit 318 (step S701). For example, the indirectly related content extraction part 720 assumes a pair of content information, which is directly related to the predetermined number or more of the relevant content information, as a pair of content information indirectly related to each other. The indirectly related content extraction part 720 executes the extraction process by each predetermined time or executes the extraction process when the directly related information storage unit 318 updates the stored information. Then, the indirectly related content extraction part 720 extracts a plurality of content information, which is assumed to be indirectly related to each other, so as to store a plurality of content information in connection with each other with the indirectly related information storage unit 716 (step S702).

As described above, the related information presentation device 710 extracts a plurality of content information which is not directly related to each other but which is assumed to be indirectly related to each other through the same relevant content information. Then, the related information presentation device 710 stores a plurality of the extracted content information in connection with each other. Thus, the related information presentation device 710 is able to accumulate a plurality of content information which is not directly related to each other but which is assumed to be indirectly related to each other through the same relevant content information.

Eighth Embodiment

Figure 27:
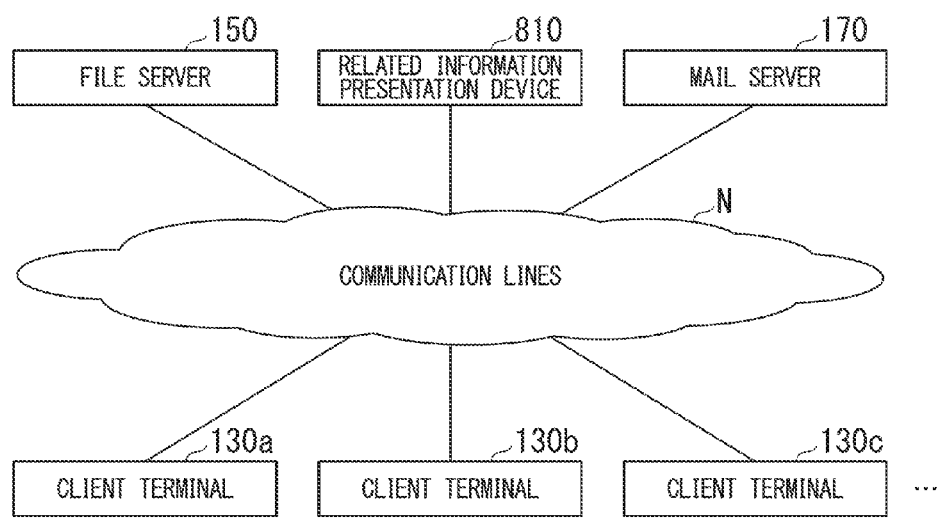
FIG. 27 is a system configuration diagram showing an example of an applied environment of a related information presentation device according to an eighth embodiment of the present invention.

FIG. 27 shows an example of an applied environment for a related information presentation device 810 according to the eighth embodiment of the present invention. The related information presentation device 810 is connected to a plurality of client terminals 130, a file server 150, and a mail server 170 via communication lines N. The communication lines N embrace the Internet, computer networks, core networks of communication carriers, and local area networks. The client terminals 130 embrace mobile terminals, information terminals (PDA etc.), and personal computers. The file server 150 administrates storage devices which are shared with other computers on networks; hence, the file server 150 is accessible from external devices. The mail server 170 is connected to the Internet so as to transmit and receive emails in networks.

Figure 28:
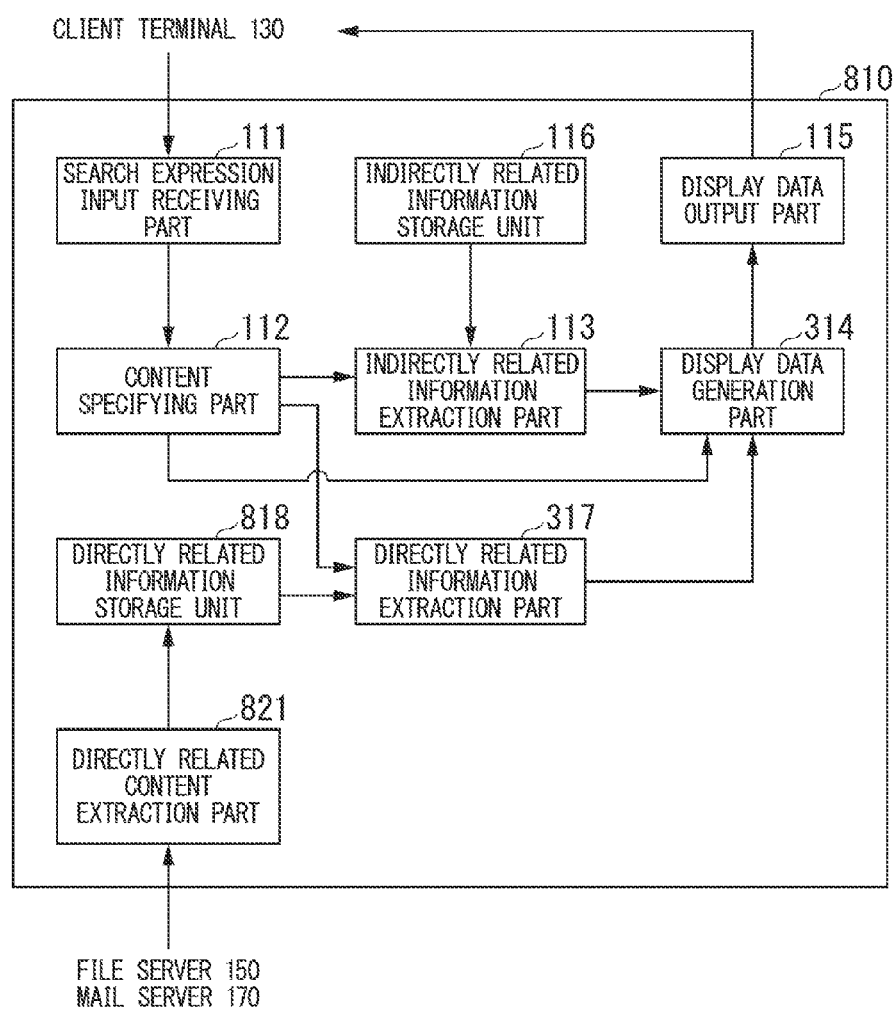
FIG. 28 is a block diagram of the related information presentation device of the eighth embodiment.

FIG. 28 is a block diagram of the related information presentation device 810 according to the eighth embodiment. The related information presentation device 810 includes a search expression input receiving part 111, a content specifying part 112, an indirectly related information extraction part 113, a display data generation part 314, a display data output part 115, an indirectly related information storage unit 116, a directly related information extraction part 317, a directly related information storage unit 818, and a directly related content extraction part 821. In the related information presentation device 810, the same reference signs are applied to the same constituent elements as the constituent elements of the related information presentation devices 110 and 310; hence, the descriptions thereof will be omitted as necessary.

The directly related content extraction part 821 analyzes data files stored in the file server 150 and emails stored in the mail server 170 so as to extract a plurality of directly related content information. The directly related information storage unit 818 stores a plurality of content information, extracted by the directly related content extraction part 821, in connection with each other. In this connection, data files stored in the file server 150 and emails stored in the mail server 170 can be defined as "information representing records of human behaviors which are generated by humans using computers".

Figure 29:
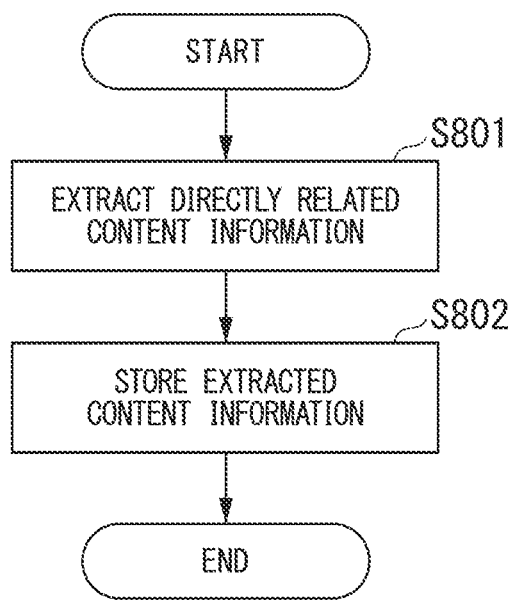
FIG. 29 is a flowchart showing the operation of the related information presentation device of the eighth embodiment.

FIG. 29 is a flowchart showing the operation of the related information presentation device 810. The flowchart shows a series of processes ranging from a process of extracting a plurality of directly related content information to a process of storing a plurality of content information. The operation of the related information presentation device 810 will be described with reference to FIGS. 27 to 29.

The directly related content extraction part 821 of the related information presentation device 810 analyzes data files stored in the file server 150 and emails stored in the mail server 170 so as to extract a plurality of directly related content information (step S801). When the file server 150 stores a text file A describing A company, for example, the directly related content extraction part 821 extracts the A company and the text file A as the directly related content information. When the mail server 170 stores a predetermined number or more of emails being transmitted and received between A-san and A-san, the directly related content extraction part 821 extracts A-san and B-san as the directly related content information. The directly related content extraction part 821 executes the extraction process by each predetermined time or executes the extraction process when the file server 150 or the mail server 170 updates the stored information thereof. Then, the directly related content extraction part 821 extracts a plurality of directly related content information so as to store a plurality of directly related content information in connection with each other with the directly related information storage unit 818 (step S802).

As described above, the related information presentation device 810 analyzes data files stored in the file server 150 and emails stored in the mail server 170 so as to extract a plurality of directly related content information. Then, the related information presentation device 810 stores a plurality of extracted content information in connection with each other. Thus, the related information presentation device 810 is able to accumulate a plurality of directly related content information.

Figure 30:
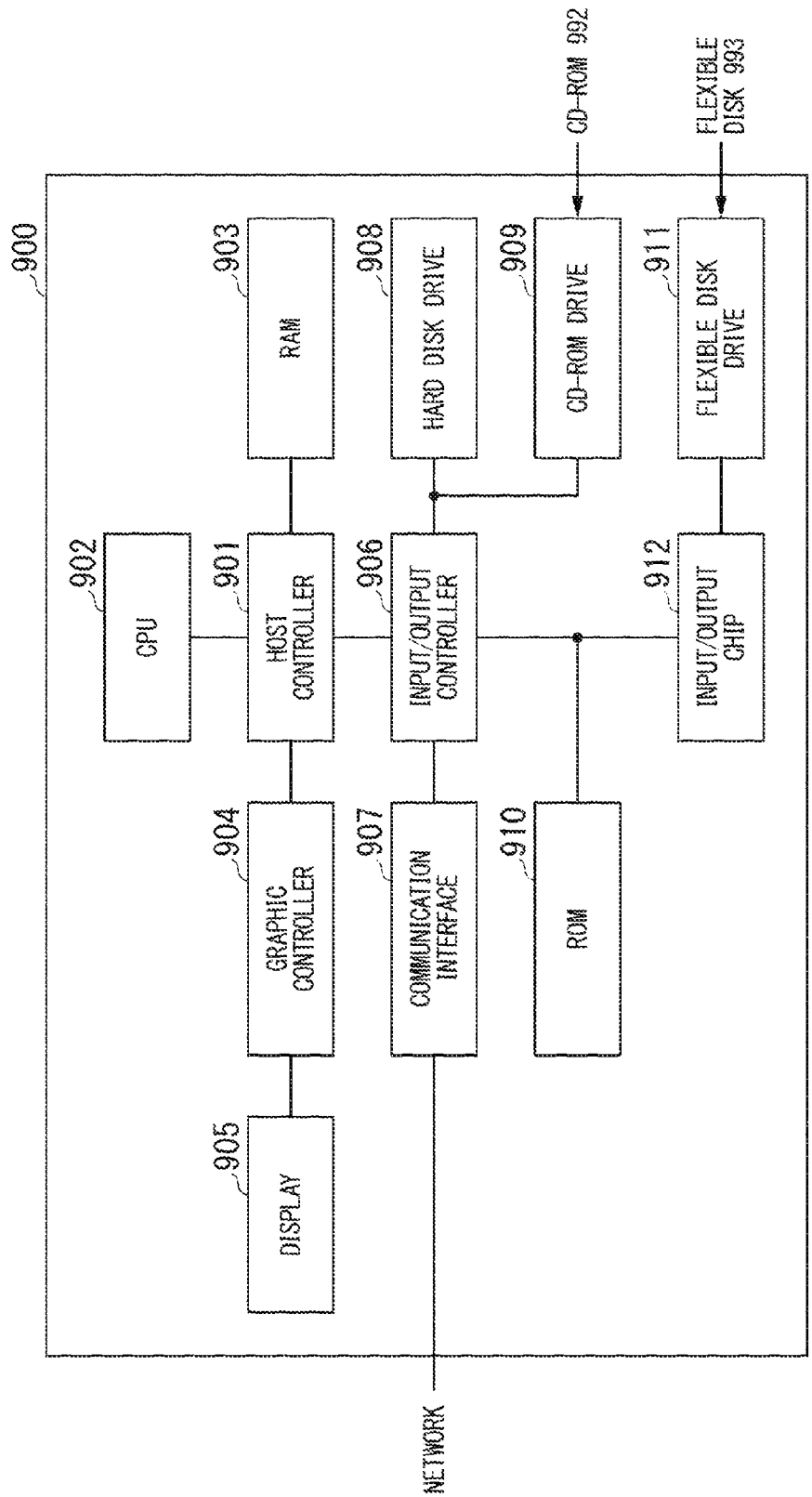
FIG. 30 shows an example of a hardware configuration of a computer implementing the functions of the related information presentation devices according to the foregoing embodiments.

FIG. 30 shows an example of a hardware configuration of a computer 900 installing the functionality of the related information presentation devices according to the foregoing embodiments. The computer 900 includes a CPU-periphery part, implementing a CPU 902, a RAM 903, a graphic controller 904, and a display 905 which are mutually connected together via a host controller 901, an input/output part, implementing a communication interface 907, a hard disk driver 908, and a CD-ROM drive 909 which are mutually connected together via an input/output controller 906, and a legacy input/output part implementing a ROM 910, a flexible disk drive 911, and an input/output chip 912 which are connected to an input/output controller 906.

The host controller 901 connects the RAM 903, the CPU 902 accessing the RAM 903 at a high transfer rate, and the graphic controller 904 together. The CPU 902 operates based on programs stored in the RAM 903 and the ROM 910 so as to control various parts of the computer 900. The graphic controller 904 retrieves image data produced on a frame buffer formed in the RAM 903 so as to display images on the screen of the display 905. Alternatively, the graphic controller 904 may include a frame buffer configured to store image data generated by the CPU 902.

The input/output controller 906 connects the host controller 901, the communication interface 907, serving as a relatively high-speed input/output device, the hard disk drive 908, and the CD-ROM drive 909 together. The hard disk drive 908 stores programs and data used for the CPU 902. The CD-ROM drive 909 reads programs and data from the CD-ROM 992 so as to provide programs and data to the hard disk drive 908 via the RAM 903.

The input/output controller 906 is connected to the ROM 910, the flexible disk drive 911 and the input/output chip 912 serving as relatively low-speed input/output devices. The ROM 910 stores boot programs which the CPU 900 executes to start its operation, and programs depending on the hardware of the computer 900. The flexible disk drive 911 reads programs and data from a flexible disk 993 so as to provide programs and data to the hard disk drive 908 via the RAM 903. The input/output chip 912 connects the flexible disk drive 911 to the input/output controller 906 while connecting various input/output devices (not shown) to the input/output controller 906 via parallel ports, serial ports, keyboard ports, and mouse ports.

Programs which are provided to the hard disk drive 908 via the RAM 903 are stored in storage media such as the flexible disk 993, the CD-ROM 992, or an IC card, which will be provided to each user. Programs read from storage media are installed in the hard disk drive 908 via the RAM 903 in the computer 900, and therefore the CPU 902 will execute those programs.

The foregoing programs are installed in the computer 900 so that the computer 900 may server as a related information presentation device. The computer 900 may carry out the functions implementing the indirectly related information storage unit storing a plurality of content information which is not directly related to each other but which is assumed to be indirectly related to each other via the same relevant content information; the search expression input receiving part which receives a user's input of a search expression in step S101; the content specifying part which specifies single content information based on the user's search expression in step S102; the indirectly related information extraction part which extracts any content information correlated to the content information specified by the content specifying part among the stored information of the indirectly related information storage unit in step S103; the display data generation part which generates display data representing a graph connecting between a node representing the content information specified by the content specifying part and a node representing the content information extracted by the indirectly related information extraction part via an edge in step S104; and the display data output part which outputs the display data in step S105.

The computer 900 installing the foregoing programs may carry out the functions implementing the indirectly related information storage unit which stores a plurality of content information, which is not directly related to each other but which is assumed to be indirectly related to each other via the same relevant content information, in connection with the relevant content information; the indirectly related information extraction part which extracts the relevant content information correlated to the content information specified by the content specifying part among the stored information of the indirectly related information storage unit in step S203; and the display data generation part which generates display data representing a graph connecting between a node representing the content information specified by the content specifying part and a node representing the content information extracted by the indirectly related information extraction part through a node representing the relevant content information via edges.

The computer 900 installing the foregoing programs may carry out the functions implementing the directly related information storage unit which stores a plurality of directly related content information in connection with each other; the directly related information extraction part which extracts the content information correlated to the content information specified by the content specifying part among the stored information of the directly related information storage unit in step S306; and the display data generation part which generates display data representing a graph connecting between a node representing the content information specified by the content specifying part and a node representing the content information extracted by the directly related information extraction part via an edge.

The computer 900 installing the foregoing programs may carry out the functions implementing the directly related information storage unit which stores a plurality of directly related content information in connection with keywords related thereto; the directly related information extraction part which extracts keywords correlated to the content information specified by the content specifying part among the stored information of the directly related information storage unit in step S406; and the display data generation part which generates display data representing a graph superposing a balloon, indicating a keyword, on an edge connecting a plurality of nodes in step S404.

The computer 900 installing the foregoing programs may carry out the functions implementing the link specifying part which specifies a link between the content information specified by the content specifying part and the predetermined content information by sequentially tracing a plurality of directly related content information based on the stored information of the directly related information storage unit in step S507; and the display data generation part which generates display data representing a graph connecting between a node representing the content information specified by the content specifying part and a node representing the predetermined information through nodes representing other necessary content information via edges in accordance with the link between a plurality of content information specified by the link specifying part in step S504.

The computer 900 installing the foregoing programs may carry out the functions implementing the link specifying part which specifies a link between the content information specified by the content specifying part, the user's selected content information, and the predetermined content information by sequentially tracing a plurality of directly related content information based on the stored information of the directly related information storage unit in step S607; and the display data generation part which generates display data representing a graph connecting a node representing the content information specified by the content specifying part, a node representing the user's selected content information, and a node representing the predetermined content information through node representing other necessary content information via edges in accordance with a link between a plurality of content information specified by the link specifying part in step S604.

The computer 900 installing the foregoing programs may carry out the functions implementing the indirectly related content extraction part which extracts a plurality of content information which is not directly related to each other but which is assumed to be indirectly related to each other via the same relevant content information based on the stored information of the directly related information storage unit in step S701; and the indirectly related information storage unit which stores a plurality of content information, extracted by the indirectly related content extraction part, in connection with each other.

The computer 900 installing the foregoing programs may carry out the functions implementing the directly related content extraction part which analyzes information, representing records of human behaviors produced by humans using computers, so as to extract a plurality of directly related content information in step S801; and the directly related information storage unit which stores a plurality of content information, extracted by the directly related content extraction part, in connection with each other.

The computer 900 embodies the functionality of a related information presentation device in cooperation with hardware resources and software described in the foregoing programs. Specifically, it implements the search expression input receiving part; the content specifying part, the indirectly related information extraction part, the display data generation part, the display data output part, the indirectly related information storage unit, the directly related information extraction part, the directly related information storage unit; the link specifying part; the indirectly related content extraction part, and the directly related content extraction part. By carrying out operations and processes on information via combinations of those concrete means, it is possible to realize a related information presentation device having a configuration suited to usage purposes on the computer 900.

When the computer 900 communicates with an external device, for example, the CPU 902 executes a communication program loaded to the RAM 903, thus instructing a communication process with the communication interface 907 according to the procedure described in the communication program. Under the control of the CPU 902, the communication interface 907 reads transmitting data, stored in a transmission buffer area formed in a storage device such as the RAM 903, the hard disk drive 908, the flexible disk 993, or the CD-ROM 992, so as to transmit the transmitting data to networks, or the communication interface 907 writes received data networks into a reception buffer area formed in a storage device. Thus, the communication interface 907 may transfer transmitting/received data with the storage device according to the direct memory access method. Alternatively, the CPU 902 may transfer transmitting/received data by reading data from a transfer source such as the storage device or the communication interface 907 and by writing data into a transfer destination such as the storage device or the communication interface 907.

Alternatively, the CPU 902 may load the entirety or necessary part of files, stored in an external storage device such as the hard disk drive 908, the CD-ROM 992, or the flexible disk 993, or the entirety or necessary part of files stored in a database into the RAM 903 according to the direct memory access method, and then the CPU 902 may carry out various processes on data of the RAM 903. Thereafter, the CPU 902 may write back the processed data into an external storage device according to the direct memory access method.

In the above processing, the RAM 903 serves as a storage device configured to temporarily hold the stored content of an external storage device. The predetermined information processing is carried out with the storage device configured to store various programs, data, tables, and databases used for the foregoing embodiments. Additionally, the CPU 902 may temporarily hold the stored content of the RAM 903 in a cache memory, and therefore the CPU 902 may read or write data on the cache memory. In this case, the cache memory can be classified into a storage device bearing part of the function of the RAM 903.

Additionally, the CPU 902 executes various operations, information processing, conditional decisions, information retrieval, or information substitution designated by program instructions on data read from the RAM 903, thus writing back data to the RAM 903. When the CPU 902 carries out conditional decisions, for example, the CPU 902 may determine whether various variables meet conditions such as larger, smaller, above, below, or equal in comparison with other variables or constants. The processing will be branched to other instructions or the CPU 902 will call subroutines when variables successfully meet conditions or when variables fail to meet conditions.

Additionally, the CPU 902 may search files of storage devices or information of databases. When a storage device stores a plurality of entries with second attributes correlated to first attributes, for example, the CPU 902 searches an entry whose first attribute meets the predetermined condition among a plurality of entries stored in the storage device so as to read a second attribute correlated to the entry, thus obtaining the second attribute correlated to the first attribute meeting the predetermined condition.

The foregoing programs or modules may be stored in an external storage device. As storage media applicable to the computer 900, it is possible to use optical storage media such as DVD or CD, magneto-optic storage media such as MO disks, magnetic tapes, and semiconductor memory such as IC cards other than the flexible disk 993 and the CD-ROM 992. Additionally, it is possible to provide the computer 900 with programs by use of storage media such as hard disks and RAM installed in server systems connected to the Internet or private communication networks.

Lastly, the present invention is not necessarily limited to the foregoing embodiments, which can be applied with various design changes or modifications embraced within the scope of the invention defined by the appended claims.

INDUSTRIAL APPLICABILITY

The present invention provides a related information presentation device and a related information presentation method applied to a keyman search system configured to search human network information and related information. The applied field of the present invention is not necessarily limited to transmission and reception of search information between clients and servers. The present invention is designed to automatically detect links between a plurality of information so as to dynamically search and provide any information unanticipated by each user; hence, the present invention can be applied to a broad range of electronic devices.

REFERENCE SIGNS LIST

110, 210, 310, 410, 510, 610, 710, 810 related information presentation device
111 search expression input receiving part
112 content specifying part
113, 213 indirectly related information extraction part
114, 214, 314, 414, 514, 614 display data generation part
115 display data output part
116, 216, 716 indirectly related information storage unit
130 client terminal
150 file server
170 mail server
317, 417 directly related information extraction part
318, 418, 818 directly related information storage unit
519, 619 link specifying part
720 indirectly related content extraction part
821 directly related content extraction part
F search form
SB search button

The invention claimed is:
1. A related information presentation device which provides a client terminal, connected to a network, with a plurality of content information related to each other, comprising:
    a directly related information storage unit that stores the plurality of content information directly related to each other;
    an indirectly related information storage unit that stores a plurality of content information indirectly related to each other through same relevant content information;
    a search expression input receiving part that receives, via a communication interface in connection with the network, a search expression input by a user of the client terminal;
    a content specifying part configured that searches specific content information based on the search expression;
    a directly related information extraction part that extracts the content information, correlated to the specific content information searched by the content specifying part, from the directly related information storage unit;
    an indirectly related information extraction part that automatically extracts content information, correlated to the specific content information searched by the content specifying part, from the indirectly related information storage unit;
a display data generation part that creates at least one of a graph connecting between a node representing the specific content information and a node representing the content information extracted from the directly related information storage unit via an edge and a graph connecting between the node representing the specific content information and a node representing the content information extracted from the indirectly related information storage unit via an edge in a predetermined format adapted to the client terminal, thus generating display data representing the graph; and
a display data output part that outputs, via the communication interface, the display data to the client terminal.

2. The related information presentation device according to claim 1,
wherein the indirectly related information extraction part extracts relevant content information, correlated to the specific content information searched by the content specifying part, from the indirectly related information storage unit, and
wherein the display data generation part generates display data representing a graph connecting between the node representing the specific content information and the node representing the content information extracted from the indirectly related information storage unit through a node representing the relevant content information via edges.

3. The related information presentation device according to claim 1,
wherein the directly related information storage unit stores the plurality of directly related content information in connection with keywords related thereto,
wherein the directly related information extraction part extracts a keyword, correlated to the specific content information, from the directly related information storage unit, and
wherein the display data generation part generates display data representing a graph superposing a balloon representing the keyword on the edge connecting between a plurality of nodes.

4. The related information presentation device according to claim 1, further comprising:
a link specifying part that specifies a link between the specific content information and predetermined content information by sequentially tracing the plurality of directly related content information in the directly related information storage unit based on the specific content information searched by the content specifying part,
wherein the display data generation part generates display data representing a graph connecting between the node representing the specific content information and a node representing the predetermined content information through a node representing intermediate content information between the nodes via edges in accordance with the link specified by the link specifying part.

5. The related information presentation device according to claim 4,
wherein the link specifying part specifies a link between the specific content information, user's selected content information, and the predetermined content information by sequentially tracing the plurality of directly related content information in the directly related information storage unit based on the specific content information, and
wherein the display data generation part generates display data representing a graph connecting between the node representing the specific content information, a node representing the user's selected content information, and the node representing the predetermined content information through nodes representing intermediate content information between the nodes via edges in accordance with the link specified by the link specifying part.

6. The related information presentation device according to claim 1, further comprising:
an indirectly related content extraction part that extracts a plurality of content information which is not directly related to each other but which is indirectly related to each other through same relevant content information,
wherein the indirectly related information storage unit stores the plurality of content information extracted by the indirectly related content extraction part in connection with each other.

7. The related information presentation device according to claim 1, further comprising:
a directly related content extraction part that extracts a plurality of directly related content information by analyzing information representing human records produced by humans using computers,
wherein the directly related information storage unit stores the plurality of content information extracted by the directly related content extraction part in connection with each other.

8. A related information presentation method which provides a client terminal with a plurality of content information related to each other, the method to be implemented by a device that includes a CPU in connection with a communication interface that communicates with the client terminal via a network and a memory having program code recorded thereon by which the CPU operates, the method comprising:
receiving, via the network, a search expression input by a user of the client terminal;
searching specific content information based on the search expression;
extracting content information, correlated to the specific content information, from a plurality of content information directly related to each other and a plurality of content information indirectly related to each other through same relevant content information;
creating at least one of a graph connecting between a node representing the specific content information and a node representing the content information extracted from the plurality of content information directly related to each other via an edge and a graph connecting between the node representing the specific content information and a node representing the content information extracted from the plurality of content information indirectly related to each other via an edge in a predetermined format adapted to the client terminal, thus generating display data representing the graph; and
transmitting the display data via the network to the client terminal to be displayed on a display screen of the client terminal.

9. A non-transitory computer-readable storage medium having stored thereon a program that, upon execution by a device equipped with a CPU, a memory, and a network communication interface, causes the device to implement the related information presentation method according to claim 8.

10. A related information presentation device which provides a client terminal, connected to a network, with a plurality of content information related to each other, comprising:
   a CPU,
   a network communication interface in connection with the CPU, and
   a memory having stored thereon at least program code, executable by the CPU, that causes the CPU upon execution to operate as:
      a directly related information storage unit that stores the plurality of content information directly related to each other;
      an indirectly related information storage unit that stores a plurality of content information indirectly related to each other through same relevant content information;
      a search expression input receiving part that receives, via a communication interface in connection with the network, a search expression input by a user of the client terminal;
      a content specifying part configured that searches specific content information based on the search expression;
      a directly related information extraction part that extracts the content information, correlated to the specific content information searched by the content specifying part, from the directly related information storage unit;
      an indirectly related information extraction part that automatically extracts content information, correlated to the specific content information searched by the content specifying part, from the indirectly related information storage unit;
      a display data generation part that creates at least one of a graph connecting between a node representing the specific content information and a node representing the content information extracted from the directly related information storage unit via an edge and a graph connecting between the node representing the specific content information and a node representing the content information extracted from the indirectly related information storage unit via an edge in a predetermined format adapted to the client terminal, thus generating display data representing the graph; and
      a display data output part that outputs, via the communication interface, the display data to the client terminal to be displayed by a display screen of the client terminal.

11. The related information presentation device according to claim 10,
   wherein the indirectly related information extraction part extracts relevant content information, correlated to the specific content information searched by the content specifying part, from the indirectly related information storage unit, and
   wherein the display data generation part generates display data representing a graph connecting between the node representing the specific content information and the node representing the content information extracted from the indirectly related information storage unit through a node representing the relevant content information via edges.

12. The related information presentation device according to claim 10,
   wherein the directly related information storage unit stores the plurality of directly related content information in connection with keywords related thereto,
   wherein the directly related information extraction part extracts a keyword, correlated to the specific content information, from the directly related information storage unit, and
   wherein the display data generation part generates display data representing a graph superposing a balloon representing the keyword on the edge connecting between a plurality of nodes.

13. The related information presentation device according to claim 10, wherein the software code further causes the CPU to operate as:
   a link specifying part that specifies a link between the specific content information and predetermined content information by sequentially tracing the plurality of directly related content information in the directly related information storage unit based on the specific content information searched by the content specifying part,
   wherein the display data generation part generates display data representing a graph connecting between the node representing the specific content information and a node representing the predetermined content information through a node representing intermediate content information between the nodes via edges in accordance with the link specified by the link specifying part.

14. The related information presentation device according to claim 13,
   wherein the link specifying part specifies a link between the specific content information, user's selected content information, and the predetermined content information by sequentially tracing the plurality of directly related content information in the directly related information storage unit based on the specific content information, and
   wherein the display data generation part generates display data representing a graph connecting between the node representing the specific content information, a node representing the user's selected content information, and the node representing the predetermined content information through nodes representing intermediate content information between the nodes via edges in accordance with the link specified by the link specifying part.

15. The related information presentation device according to claim 10, wherein the software code further causes the CPU to operate as:
   an indirectly related content extraction part that extracts a plurality of content information which is not directly related to each other but which is indirectly related to each other through same relevant content information,
   wherein the indirectly related information storage unit stores the plurality of content information extracted by the indirectly related content extraction part in connection with each other.

16. The related information presentation device according to claim 10, wherein the software code further causes the CPU to operate as:
   a directly related content extraction part that extracts a plurality of directly related content information by analyzing information representing human records produced by humans using computers, wherein the directly related information storage unit stores the plurality of content information extracted by the directly related content extraction part in connection with each other.

* * * * *